United States Patent [19]
Eng et al.

[11] Patent Number: 5,638,092
[45] Date of Patent: Jun. 10, 1997

[54] CURSOR CONTROL SYSTEM

[76] Inventors: Tommy K. Eng, #11 Rowlands Rd., Flemington, N.J. 08822; Harold G. Alles, 24400 SW. Valley View Rd., West Linn, Oreg. 97068

[21] Appl. No.: 360,912

[22] Filed: Dec. 20, 1994

[51] Int. Cl.⁶ .................................................. G08C 19/06
[52] U.S. Cl. ........................... 345/158; 345/168; 341/20; 341/22
[58] Field of Search ................................ 345/156, 157, 345/158, 159, 160, 168, 169, 145; 341/20, 22; 343/728, 732, 748, 824, 866

[56] References Cited

U.S. PATENT DOCUMENTS

| | | | |
|---|---|---|---|
| 3,846,580 | 11/1974 | Brenner | 178/19 |
| 3,904,821 | 9/1975 | Whetstone et al. | 178/19 |
| 4,540,176 | 9/1985 | Baer | 273/148 |
| 4,578,674 | 3/1986 | Baker et al. | 340/710 |
| 4,927,987 | 5/1990 | Kirchgessner | 200/5 |
| 4,954,817 | 9/1990 | Levine | 340/706 |
| 4,988,981 | 1/1991 | Zimmerman et al. | 340/709 |
| 5,010,500 | 4/1991 | Makkuni et al. | 364/521 |
| 5,095,302 | 3/1992 | McLean et al. | 340/710 |
| 5,339,095 | 8/1994 | Redford | 345/158 |
| 5,444,462 | 8/1995 | Wambach | 345/158 |
| 5,453,758 | 9/1995 | Sato | 345/158 |
| 5,481,265 | 1/1996 | Russell | 341/22 |
| 5,489,922 | 2/1996 | Zloof | 345/156 |
| 5,510,811 | 4/1996 | Tobey et al. | 345/157 |

*Primary Examiner*—Mark R. Powell
*Assistant Examiner*—Vincent E. Kovalick
*Attorney, Agent, or Firm*—Skjerven, Morrill, MacPherson, Franklin & Friel; Brian D. Ogonowsky; E. Eric Hoffman

[57] ABSTRACT

A cursor control system and method for moving a cursor on a computer screen in response to movement of a ring over a keyboard. A ring contains a transmitter circuit which is activated by a switch positioned on the ring. A signal generated by the transmitter circuit is transmitted to a receiver attached to a computer keyboard. The receiver detects motion of the transmitter circuit over the keyboard and, in response, generates signals which are used to control the movement of the cursor on the computer screen.

34 Claims, 13 Drawing Sheets

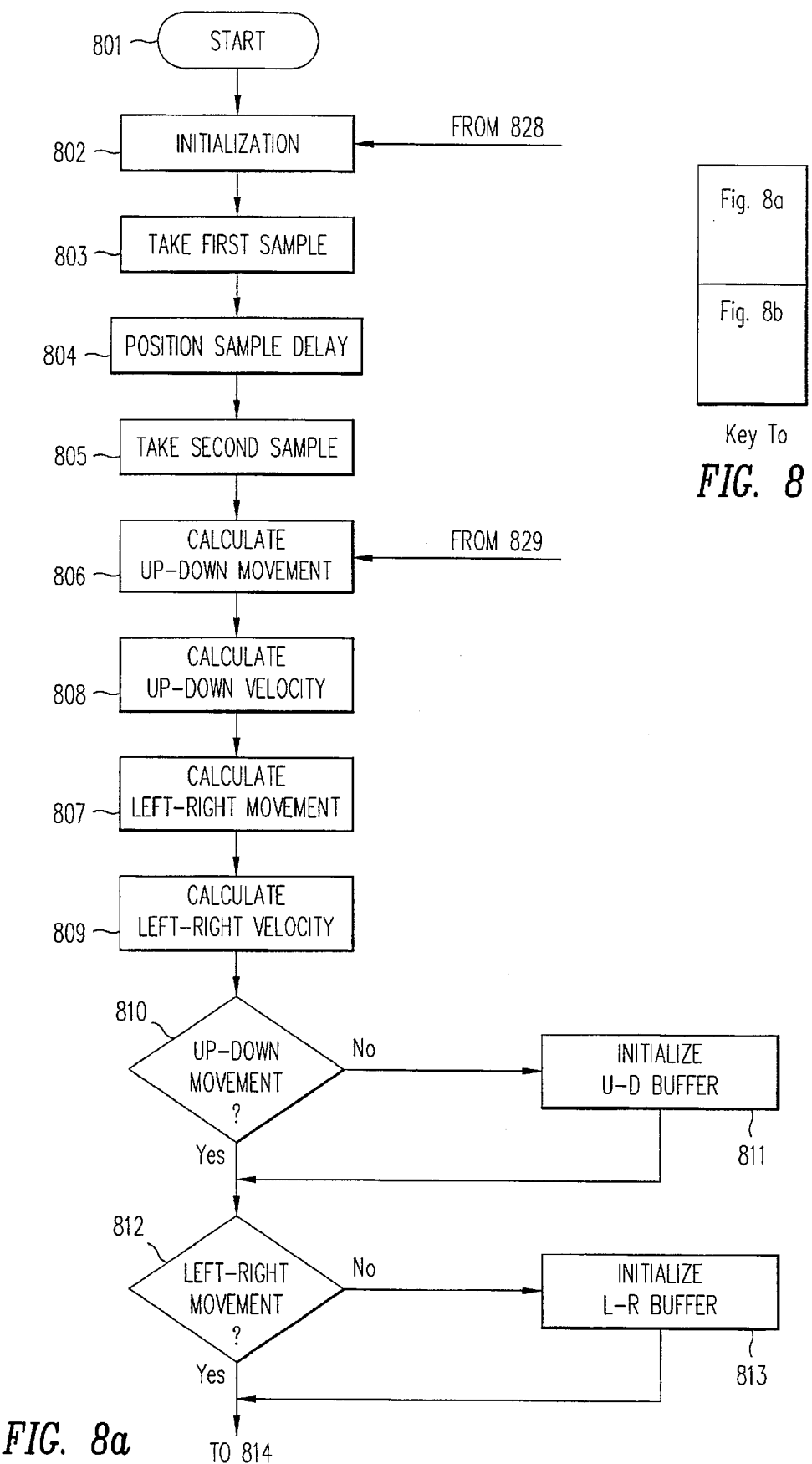

CURSOR CONTROL SYSTEM

BACKGROUND OF THE INVENTION

1. Field of the Invention

The present invention relates to a circuit and method for controlling a cursor on a video display terminal.

2. Description of the Prior Art

A conventional mouse, track ball, joy stick, touch sensitive pad, pressure sensitive pad, or virtual reality position sensor (hereinafter jointly referred to as peripheral computer input devices) can be used to position a cursor on a computer screen. Peripheral computer input devices typically include a button which can be actuated by a user to perform additional functions, such as operating pull-down or pop-up menus, sizing windows and making selections.

Conventional peripheral computer input devices have one or more disadvantages. First, they require a certain amount of physical space in which to operate. When operating a computer in a small operating space (e.g., on an airplane, in a bus), conventional peripheral computer input devices become cumbersome or impossible to use in such environments.

Additionally, peripheral computer input devices are somewhat inconvenient because their operation requires the user to completely remove at least one hand from the area of the keyboard. Moreover, conventional peripheral computer input devices require moving mechanical parts which can experience mechanical wear over extended periods of use. These mechanical parts are relatively expensive to manufacture and replace. Furthermore, conventional computer input devices are cumbersome because they typically require a wire to be connected between the input device and the computer.

Some peripheral computer input devices have been integrated into portable computers. However, there are disadvantages to such integrated computer input devices. For example, the integrated computer input device consumes valuable space within the portable computer. In addition, the integrated computer input device is typically placed in an inconvenient location on the portable computer due to size constraints. Furthermore, the miniaturization which allows the computer input device to be integrated with the computer results in diminished usability of the computer input device. No integrated portable computer input device has yet matched the usability of a conventional desktop mouse.

Several alternatives have been developed which attempt to remedy the above listed shortcomings of conventional peripheral computer input devices. However, none of these alternatives have completely addressed the above-listed problems. Certain of these alternatives are described in U.S. Pat. Nos. 4,954,817 (Levine); 4,988,981 (Zimmerman et al.); 3,846,580 (Brenner); 3,904,821 (Whetstone et al.); 4,540,176 (Baer); 4,927,987 (Kirchgessner); 5,095,302 (McLean et al.); and 5,010,500 (Makkuni et al.).

It would therefore be desirable to have a computer input device which overcomes the above-listed disadvantages of conventional peripheral computer input devices.

SUMMARY

Accordingly, the present invention provides for a cursor control system for moving a cursor on a computer screen in response to movement of a ring over a keyboard. The ring contains a transmitter circuit which is turned on or off by a touch sensitive switch positioned on the ring. A signal generated by the transmitter circuit is transmitted to a receiver mounted within a computer keyboard. The receiver responds to the signal generated by the transmitter circuit in a manner which allows the receiver to detect the movement of the transmitter circuit over the keyboard.

In one embodiment, the receiver comprises first and second receiver means. First and second signals are induced in the first and second receiver means, respectively. The first receiver means is positioned such that the first signal varies only as the ring is moved along an up-down axis over the keyboard. The second receiver means is positioned such that the second signal varies as the ring is moved along a left-right axis over the keyboard as well as the up-down axis over the keyboard. The first and second signals are used to control the movement of the cursor on the computer screen.

The transmitter circuit can include an inductive coil connected in parallel with a capacitor. The inductive coil and capacitor are selected to resonate at a first frequency. As a result, the inductive coil transmits a signal having the first frequency to the receiver through the free space between the ring and the keyboard. The transmitter circuit can be powered by batteries located within the ring. As a result, no physical connection to the ring is required.

In one embodiment, the first receiver means includes a first receiver coil having one or more substantially equal sized loops which traverse an outer perimeter of the keyboard. The second receiver means can then include a second receiver coil having a plurality of loops, wherein the sizes of the loops progressively increase along the left-right axis. The second coil can be formed within an area defined by the first coil. Because the first and second receiver means are integrated with the keyboard structure, no additional operating space is consumed by these elements.

In accordance with one embodiment of the invention, the cursor control system differentiates between slow-changing signals induced in the receiver which are caused by finger motion and fast-changing signals induced in the receiver which are caused by switching the transmitter on and off. The slow-changing signals are used to communicate positional information which causes cursor movement. The fast-changing signals are used to communicate non-positional information, such as transmitter on/off status and click button on/off status, to the cursor control system. The fast-changing signals do not cause cursor movement.

In accordance with another embodiment, the cursor control system calculates the velocity of the ring from the first and second signals and scales the movement of the cursor on the computer screen in response to the calculated velocity. Thus, the cursor can be moved a large distance across the computer screen in response to high calculated velocity, and a small distance across the computer screen in response to a low calculated velocity. This dynamic scaling advantageously allows the user to rapidly and accurately move the cursor over the entire computer screen by moving the ring over a relatively small space over the keyboard.

In another embodiment of the invention, several samples of the first and second signals are stored and processed to eliminate small involuntary movements of the ring due to unsteady finger movement.

In yet another embodiment of the invention, the cursor control system samples the first and second signals to obtain first and second sets of data values, respectively. The first and second sets of data values are monitored to determine when these sets of data values correspond to data values representative of ring movement along either the up-down axis or the left-right axis. When a movement trend is detected along either the up-down axis or the left-right axis, an increased gain is applied to data values which are representative of movement along the detected axis and a reduced gain is applied to data values which are representative of movement which is not along the detected axis. In this manner, the user is assisted in moving the cursor in straight lines on the computer screen along the up-down and left-right axes.

The present invention will be more fully understood in light of the following detailed description taken together with the drawings.

DETAILED DESCRIPTION OF THE INVENTION

Figure 1:
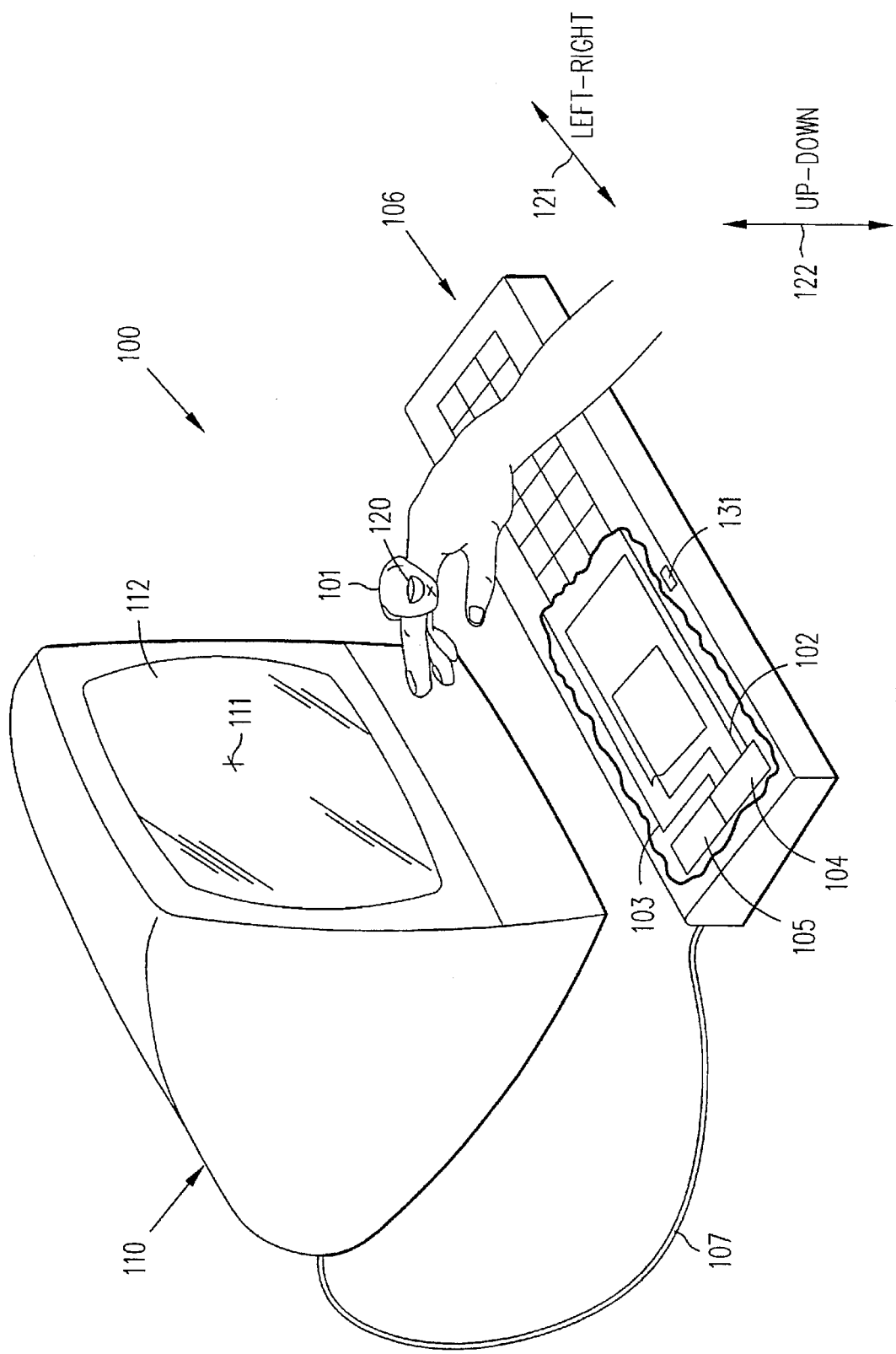
FIG. 1 is a schematic diagram illustrating a cursor control system in accordance with the invention.

FIG. 1 is a schematic diagram illustrating a cursor control system 100 in accordance with one embodiment of the present invention. Cursor control system 100 includes ring 101, receiver coils 102 and 103, control circuit 104 and microprocessor 105. In the embodiment illustrated, ring 101 is worn on a user's finger. However, the term "ring" as used in this application includes, but is not limited to, (1) any structure which fits over one or more fingers (including a thumb) of a user's hand, (2) any structure which can be held comfortably with two or more fingers and (3) any structure which fits comfortably in the palm of the user's hand. Coils 102 and 103 are mounted below the keys inside keyboard 106. Control circuit 104 and microprocessor 105 are built into keyboard 106. A conventional mouse "click" switch 131 is mounted at the bottom of keyboard 106. Click switch 131 performs the equivalent function of a click button typically found on a conventional mouse. A conventional keyboard cable 107 connects microprocessor 105 to a keyboard and mouse input port (not shown) of computer 110. FIG. 1 also illustrates the orientation of a left-right axis 121 and an up-down axis 122 which are defined with respect to the motion of the user's hand.

Ring 101 includes a battery powered transmitter which is activated by switch 120 embedded in ring 101. In general, ring 101 transmits a signal which is received by coils 102 and 103. Control circuit 104 and microprocessor 105 process the signals received by coils 102 and 103. The processed signals are transmitted to computer 110, thereby controlling the operation of cursor 111 on computer screen 112. The operation of cursor control system 100 is described in more detail below.

The Ring

Figure 2C:
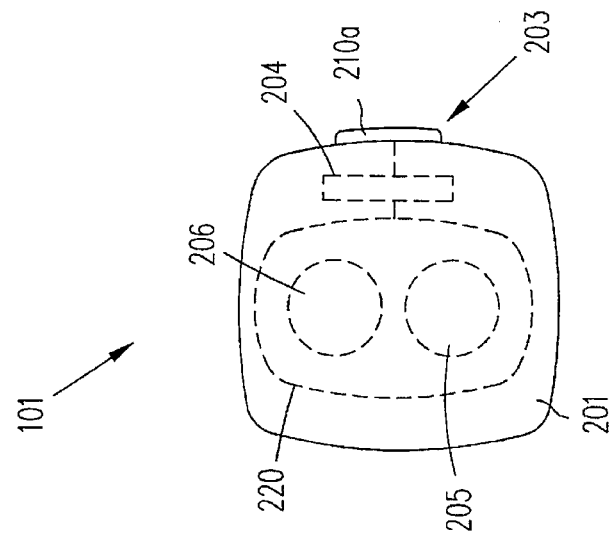
FIGS. 2a–2c are schematic diagrams illustrating front, right side and top views, respectively, of a ring of the cursor control system of FIG. 1.
Figure 2B:
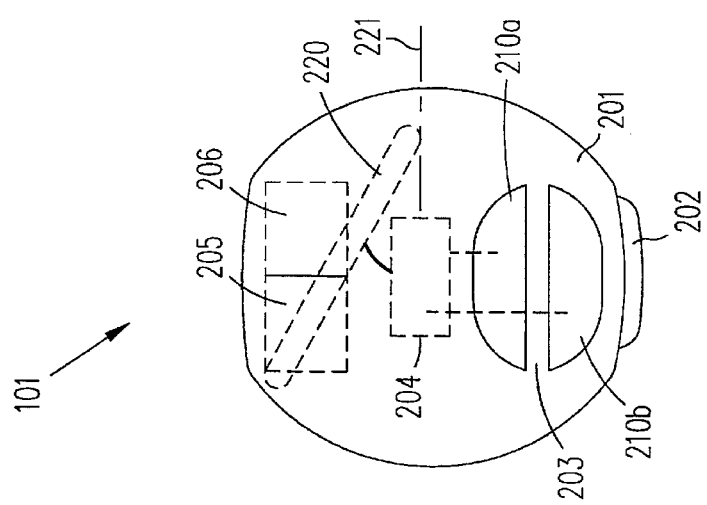
Figure 2A:
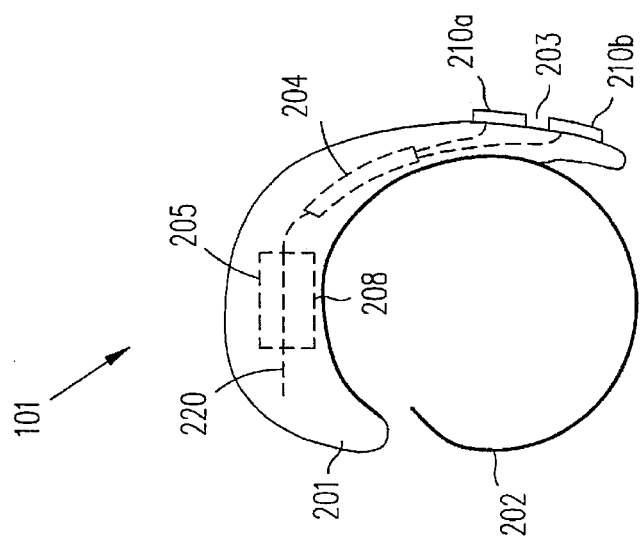

FIGS. 2a–2c are schematic diagrams illustrating front, right side and top views, respectively, of ring 101. Ring 101 includes ring body 201, ring band 202, on/off switch 203, transmitter circuit 204 and batteries 205–206. Ring body 201 can be molded of a plastic material, with transmitter circuit 204 enclosed within ring body 201. Ring band 202 may be made of a metal which can bend to provide an adjustable fit to the user's finger. Other materials, such as an elastic fabric with a velcro fastener, can be used for ring band 202.

Two 1.4 volt zinc air batteries 205–206 (conventionally used in hearing aids) are enclosed in the upper portion of ring body 201. Batteries 205–206 are accessed through an opening on the underside of ring body 201. A sliding metal cover 208 holds batteries 205–206 in place and makes electrical contact to the terminals of batteries 205–206. In other embodiments, other types and numbers of batteries can be used to power transmitter circuit 204. The operating voltage range of transmitter circuit 204 is typically 2.4 to 3 volts.

On/off switch 203 is partially enclosed within ring body 201. Switch 203 includes two conductive portions 210a and 210b exposed at the outer surface of ring body 201. Conductive portions 210a and 210b are electrically isolated from each other. Switch 203 is located on ring body 201 in a position where it is convenient for the user's thumb to simultaneously touch both pads 210a and 210b while ring 201 is worn on the user's index finger.

Transmitter circuit 204 includes an inductive oscillator coil 220 which is encapsulated in ring body 201. Oscillator coil 220 surrounds batteries 205–206. The plane in which oscillator coil 220 is wound is tilted such that coil 220 will be positioned substantially parallel to the upper surface of keyboard 106 when ring 201 is positioned on a user's index finger, and the user's index finger is positioned over keyboard 106 in a relaxed condition (FIG. 2b). In one embodiment, the plane of oscillator coil 220 is tilted approximately 25 degrees with respect to horizontal reference plane 221. Positioning coil 220 parallel to keyboard 106 improves the signal coupling between transmitter circuit 204 and receiver coils 102–103 located in keyboard 106. In addition, this positioning minimizes the effect of changes in the angular orientation of oscillator coil 220 as coil 220 is moved.

Figure 3:
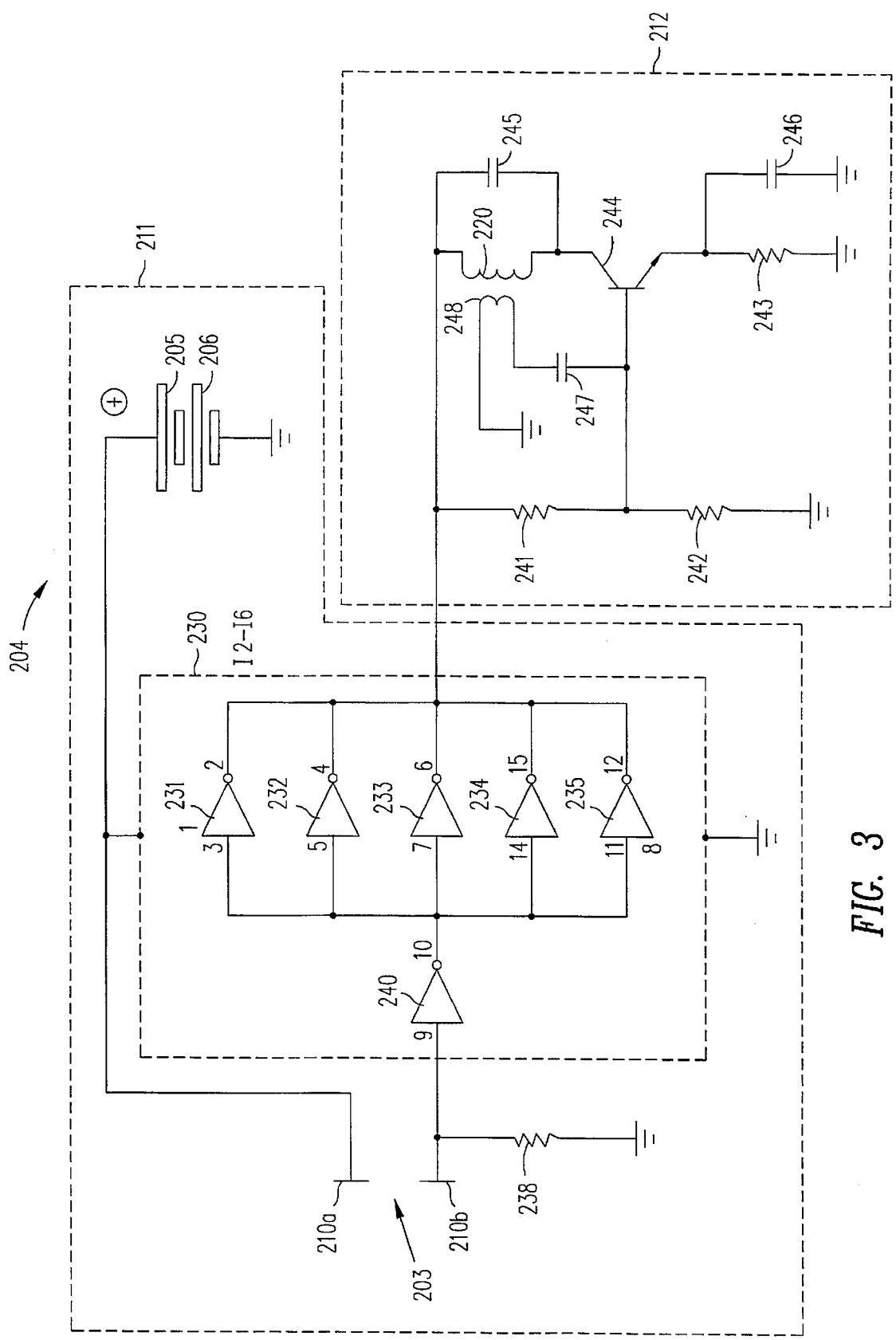
FIG. 3 is a schematic diagram of a transmitter circuit located in the ring of FIGS. 2a–2c.

FIG. 3 is a schematic diagram of transmitter circuit 204. Transmitter circuit 204 includes power supply circuit 211 and oscillator circuit 212. In one embodiment, the elements of transmitter circuit 204 are discrete components. In another embodiment, the elements of transmitter circuit 204 (excluding on/off switch 203, batteries 205 and 206 and oscillator coil 220) are fabricated in a single integrated circuit.

Power supply circuit 211 includes on/off switch 203, batteries 205–206, inverter circuit 230 and resistor 238. Batteries 205 and 206 are connected in series to provide a positive voltage to pad 210a and CMOS hex inverter integrated circuit 230. Inverter circuit 230, which includes parallel CMOS inverters 231–235 and 240, is a conventional part available from National Semiconductor as part number CD4049. Inverter circuit 230 is also connected to a ground supply voltage, thereby providing power to inverter circuit 230. Pad 210b is connected to the ground supply voltage though a 1 megaohm resistor 238. Pad 210b is also coupled to the input terminal of CMOS inverter 240.

The input signal to inverter 240 is held low by the ground connection through resistor 238 when no connection exists between pads 210a and 210b. As a result, a low signal is provided at the output terminal of inverter circuit 230. Consequently, inverter circuit 230 does not provide power to oscillator circuit 212 during these conditions. Inverter circuit 230 draws negligible current (less than 1 microamp) in this state.

When the user's thumb touches on/off switch 203 (bridging pads 210a and 210b), the relatively low resistance of the human skin (when compared with the resistance of resistor 238) causes a high signal to be applied to the input terminal of inverter 240. As a result, the signal provided at the output terminal of inverter circuit 230 is a high signal which provides current to oscillator circuit 212. Inverter circuit 230 supplies the current required by oscillator circuit 212, which is approximately 0.2 mA at 2.75 volts. Batteries 205–206 are capable of providing power for several hundred hours of operation.

In another embodiment of transmitter circuit 204, a capacitance sensitive touch pad is used. A touch sensitive pad is preferred to a mechanical switch because the force required to activate or deactivate a mechanical switch can cause unwanted finger motion.

Oscillator circuit 212 includes resistors 241–243, NPN bipolar transistor 244, capacitors 245–247, and inductive coils 220 and 248. These circuit elements are connected in a conventional common emitter class A-B amplifier configuration. Resistors 241 and 242 are connected in series between the output terminal of inverter circuit 230 and ground to provide bias current to transistor 244. In one embodiment, resistors 241 and 242 have resistances of 390 kΩ and 220 kΩ, respectively. Resistor 243 and capacitor 246 are connected in parallel between the emitter of transistor 244 and ground. Resistor 243 stabilizes the bias current provided to transistor 244. Capacitor 246 provides a low impedance bypass path for the oscillation signal. In one embodiment, resistor 243 has a resistance of 470 Ω and capacitor 246 has a capacitance of 0.1 microfarads. Capacitor 245 and inductive oscillator coil 220 (See also, FIG. 2b) are connected in parallel between the output terminal of inverter circuit 230 and the collector of transistor 244. Capacitor 245 and oscillator coil 220 are selected to form a 200 kHz resonant circuit. Thus, in one embodiment, capacitor 245 has a capacitance of 0.01 microfarads and oscillator coil 220 has an inductance of 63 microhenries. In one embodiment, oscillator 220 is formed from 50 turns of conductor, with each turn having a rectangular (½ inch by ¾ inch) shape. Oscillator coil 220 is shaped to have the largest possible cross sectional area within ring 101. Other configurations are possible and within the scope of the invention. The combined impedance of capacitor 245 and oscillator coil 220 determines the strength of the signal generated by transmitter circuit 204 when the supply voltage, the transistor gain and the bias current in oscillator circuit 212 are fixed.

Inductor 248 is connected between the base of transistor 244 and ground to provide an oscillator feedback circuit. Inductor 248 is a coil having approximately ten turns which are wound around the coils of oscillator coil 220 to provide tight coupling for the oscillator feedback circuit. Capacitor 247 provides DC isolation from the base bias current and provides AC coupling of the feedback signal. In one embodiment, capacitor 247 has a capacitance of approximately 680 picofarads.

When enabled, oscillator circuit 212 generates a signal having a frequency equal to the resonant frequency of oscillator coil 220 and capacitor 245. In one embodiment, oscillator circuit 212 generates a radio frequency signal having a frequency of less than 600 kHz. In the previously described embodiment, oscillator circuit 212 generates a signal having a frequency of 200 kHz.

The Receiver Coils

Figure 4:
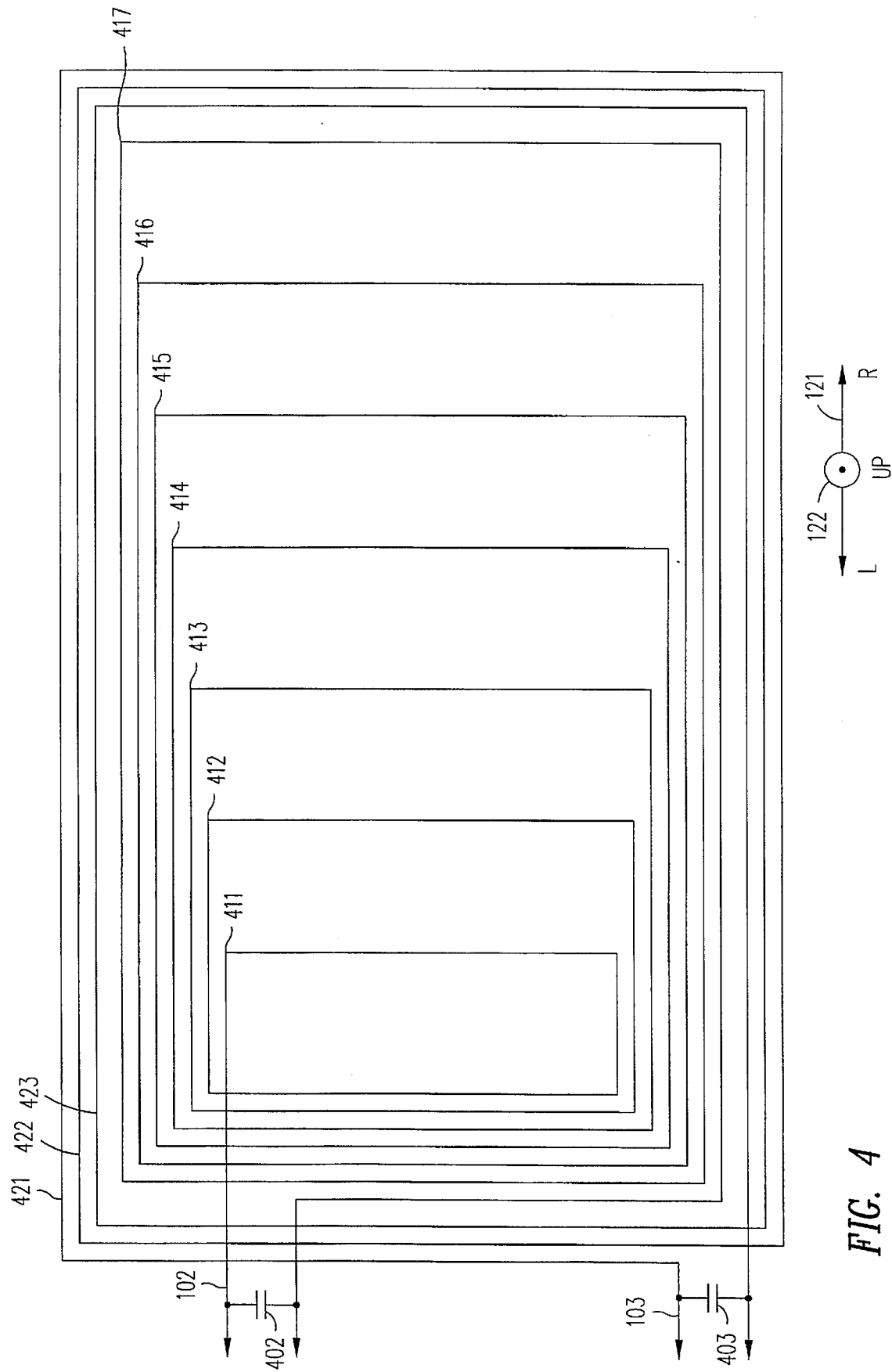
FIG. 4 is a schematic diagram of receiver coils of the cursor control system of FIG. 1.

FIG. 4 is a schematic diagram of receiver coils 102 and 103. Receiver coils 102 and 103 are constructed to minimize mutual inductance. For purposes of illustration, the spacing between the conductors of coils 102 and 103 is exaggerated. Receiver coils 102 and 103 can be wound on the plate which is conventionally used to mount the key switches of keyboard 106. Receiver coils 102 and 103 can also be made using printed circuit technology. Because the key switches are typically connected using this technology, one or more additional printed circuit layers can easily be used to fabricate receiver coils 102 and 103 in a cost effective manner. Receiver coils 102 and 103 can also be wound on a separate form which is subsequently inserted in an existing keyboard structure.

Receiver coil 102, which is used to detect the motion of ring 101 along the left-right axis 121 (See also, FIG. 1), is arranged in a plurality of loops 411–417. Each loop 411–417 is progressively longer along the left-right axis 121. Thus, the top edges of loops 411–417 are substantially co-linear, the bottom edges of loops 411–417 are substantially co-linear and the left edges of loops 411–417 are substantially co-linear. However, the right edges of loop 411–417 are spaced along the left-right axis 121. Although FIG. 4 illustrates seven loops 411–417, other numbers of loops can be used. In one embodiment, left-right receiver coil 102 includes 13 loops with the right edges of each loop spaced approximately one inch apart along the left-right axis 121. Left-right receiver coil 102 also detects the motion of ring 101 along the up-down axis 122.

Left-right receiver coil 102 is terminated with a capacitor 402 which is selected such that the parallel combination of receiver coil 102 and capacitor 402 has a resonant frequency equal to the frequency generated by transmitter circuit 204 (FIG. 3) (i.e., 200 kHz).

Receiver coil 103, which is used to detect the motion of ring 101 along up-down axis 122 (See also, FIG. 1), is arranged in one or more loops 421–423. Each of these loops 421–423 has substantially the same dimensions. Up-down receiver coil 103 surrounds receiver coil 102. In one embodiment, receiver coil 103 includes 2 rectangular loops having dimensions of 5 inches by 14 inches. Receiver coil 103 is terminated with a capacitor 403 which is selected such that the parallel combination of receiver coil 103 and capacitor 403 has a resonant frequency equal to the frequency generated by transmitter circuit 204 (FIG. 3) (i.e., 200 kHz).

The signal-to-noise ratio of the signal received by coils 102 and 103 is about the same for coils having between 2 and 20 loops. However, as fewer loops are used, a connected amplifier circuit (See, FIG. 5) must provide additional gain to provide full sensitivity.

The signal generated by transmitter circuit 204 (FIG. 3) induces signals in receiver coils 102 and 103 (FIG. 4). Changes in the strength of the signals induced in coils 102 and 103 can be caused by varying the distance between the enabled transmitter circuit 204 and receiver coils 102–103 (i.e., by moving ring 101) or by switching the on/off switch 203. However, normal movement of ring 101 creates far slower signal changes than those created by the switching of switch 203. As described in more detail below, cursor control system 100 differentiates between slow-changing signals caused by ring (finger) motion and fast-changing signals caused by switching transmitter circuit 204 on and off. The slow-changing signals are used for communicating positional information which is used to move cursor 111 on computer screen 112. The fast-changing signals do not cause cursor movement. Rather, the fast-changing signals are used to communicate encoded or non-encoded non-positional data.

The coupling between oscillator coil 220 (FIG. 3) and receiver coils 102 and 103 (FIG. 4) is mostly magnetic, and can therefore be modeled as loosely coupled transformer windings. The distance between oscillator coil 220 and receiver coils 102–103 is typically small compared to the wavelength of the 200 kHz signals generated by transmitter circuit 204. As a result, electromagnetic wave effects are minimal.

Because the distances between oscillator coil 220 and receiver coils 102–103 during normal operation are of the same order as the sizes of receiver coils 102 and 103, the coupling between oscillator coil 220 and receiver coils 102 and 103 is a complex non-linear function of the location and orientation of the transmitter. In the region of operation, signals received by receiver coils 102 and 103 are generally proportional to the inverse of the distance between oscillator coil 220 and receiver coils 102 and 103 when oscillator coil 220 is very close to receiver coils 102 and 103 (i.e., less than 6 inches). However, the signals received by receiver coils 102 and 103 are generally proportional to the inverse of the distance squared when oscillator coil 220 is positioned a large distance from receiver coils 102 and 103 (i.e., more than 6 inches).

During normal operation, the movement of oscillator coil 220 is typically limited to a fixed area in space above the keyboard 106. In general, the movement of oscillator coil 220 is limited to a 4 inch by 4 inch area which extends 4 inches above the "j" key and 2 inches to the left and the right of the "j" key. As a result, the relationship between the position of ring 101 from the signals received by coils 102 and 103 is generally proportional to the inverse of the distance.

Since the transmitter circuit 204 is battery powered, it is desirable to minimize the power required to operate cursor control system 100. Two major factors which determine the required power are (1) the coupling between oscillator coil 220 and receiver coils 102–103 and (2) the competing signals (noise) received by receiver coils 102–103.

To optimize the coupling between oscillator coil 220 and receiver coils 102–103, the cross sectional area of oscillator coil 220 is made as large as possible within ring 101, and the plane of the windings of oscillator coil 220 is positioned at an angle within ring 101 as previously described, such that the plane of coil 220 is substantially parallel to the plane of the windings of receiver coils 102–103.

To minimize noise signals, receiver coils 102–103 and their associated amplifier circuits (See, FIG. 5) can be carefully placed and shielded. Most of the competing signals at 200 kHz are sub-harmonics from the various clock and data signals generated within keyboard 106 and computer 110 (FIG. 1). Undesirable signals can be emitted from computer screen 112. As the noise signals are minimized, the required operating power of transmitter circuit 204 can be reduced.

Some coupling exists between left-right receiver coil 102 and up-down receiver coil 103, especially near the left side of the coils where a large number of conductors from both coils 102–103 are grouped in the same area. However, this group of conductors is typically located outside of the area where ring 101 is moved during normal operation. For example, this group of conductors can be located under the "a" key of keyboard 106. As a result, the coupling between left-right receiver coil 102 and up-down receiver coil 103 can be ignored during the processing of the signals induced in coils 102 and 103.

Although one embodiment of the invention has been described in connection with receiver coils 102 and 103, the present invention contemplates other means for receiving the signal transmitted by transmitter circuit 204. These receiving means must be responsive to movement of transmitter circuit 204 along left-right axis 121 and up-down axis 122.

Receiver Coil Amplifiers

Figure 5:
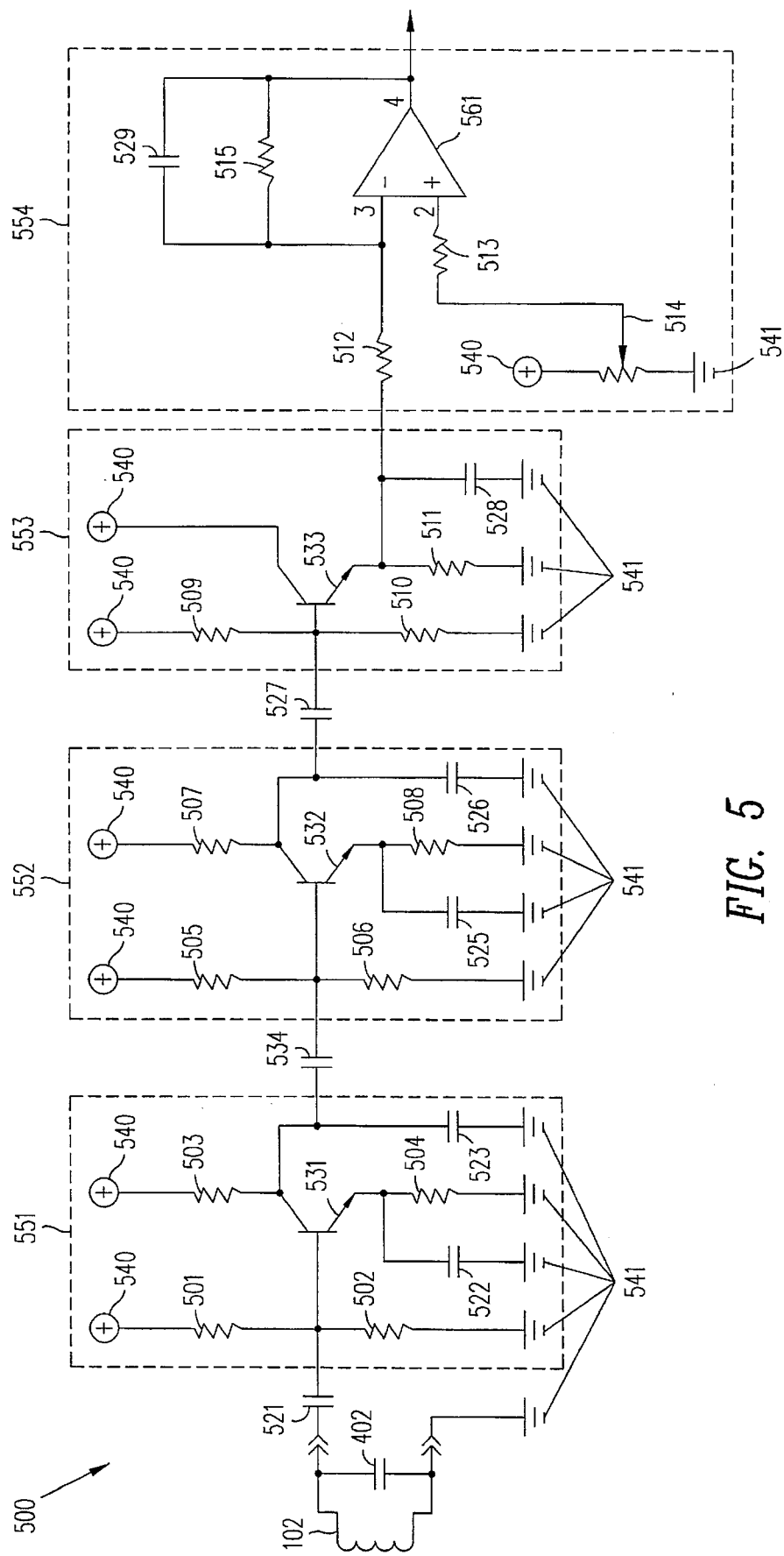
FIG. 5 is a schematic diagram of a receiver coil amplifier circuit of the cursor control system of FIG. 1.

FIG. 5 is a schematic diagram of receiver coil amplifier circuit 500. Each receiver coil 102–103 has its own associated amplifier circuit. For purposes of illustration, amplifier circuit 500 is shown connected to receiver coil 102 (and capacitor 402). Amplifier circuit 500 includes resistors 501–515, capacitors 521–529, NPN bipolar transistors 531–533, and operational amplifier 561.

Transistors 531 and 532 are configured with other circuit elements to create conventional class A, common emitter, AC coupled amplifiers 551 and 552 which are cascaded to provide the required signal gain. The signal from receiver coil 102 is AC coupled to the base of transistor 531 through capacitor 521. Capacitor 521 has a capacitance of 0.05 pF. Resistor 501 is connected between voltage supply rail 540 (held at +5 volts) and the base of transistor 531, and resistor 502 is connected between the base of transistor 531 and ground supply rail 541 (0 volts) to bias transistor 531. Resistors 501 and 502 have resistances of 150 k$\Omega$ and 56 k$\Omega$, respectively. Resistor 504, which has a resistance of 1 k$\Omega$, stabilizes the bias current. Capacitor 522, which has a capacitance of 0.05 µF, provides an AC bypass path. Resistor 503 is coupled between voltage supply rail 540 and the collector of transistor 531, thereby providing a collector load. Resistor 503 has a resistance of 6.8 k$\Omega$. Capacitor 523, which has a capacitance of 271 pF, shunts unwanted high frequency noise from the collector of transistor 531 to ground supply rail 541.

Capacitor 534 (0.05 µF) couples the collector of transistor 531 to amplifier stage 552. Amplifier stage 552 operates in a similar manner as amplifier stage 551. Resistors 505, 506, and 508 have the same values as resistors 501, 502 and 504, respectively. Capacitors 525 and 526 have the same values as capacitors 522 and 523, respectively. Resistor 507 has a resistance of 4.7 k$\Omega$ to provide the proper gain.

Transistor 533 is configured within an emitter follower peak detector circuit 553. Capacitor 527 (0.1 µF) couples the collector of transistor 552 to the base of transistor 533. Resistor 509 is connected between voltage supply rail 540 and the base of transistor 533, and resistor 510 is connected between the base of transistor 533 and ground supply rail 541, thereby biasing transistor 533. Resistors 509 and 510 have resistances of 51 kΩ and 59 kΩ, respectively. The collector of transistor 533 is connected directly to voltage supply rail 540 and the emitter of transistor 533 is connected to ground through the parallel combination of resistor 511 (2.2 kΩ) and capacitor 528 (0.05 μF). A peak (or DC rectified) signal is developed at the emitter of transistor 533. The RC time constant of resistor 511 and capacitor 528 (110 micro-seconds) is about 22 times the period of the 200 kHz signal. Consequently, resistor 511 and capacitor 528 smooth the DC component of the peak signal, while allowing circuit 553 to be responsive to quick signal changes. Capacitor 528 charges to a DC voltage which is representative of the strength of the signal detected by receiving coil 102.

Peak detector circuit 553 is connected to inverting DC amplifier circuit 554. More specifically, the emitter of transistor 533 is connected to the inverting input terminal of operational amplifier 561 through resistor 512 (22 kΩ). Operational amplifier 561 is available from National Semiconductor as part number LM2900. The inverting input terminal and the output terminal of operational amplifier 561 are coupled by the parallel combination of resistor 515 (100 kΩ) and capacitor 529 (0.05 μF). The non-inverting input terminal of operational amplifier 561 is connected through resistor 513 (47 kΩ) to variable resistor 514 (0–10 kΩ). Variable resistor 514 is connected between voltage supply rail 540 (5 volts) and ground supply rail 541 (0 volts) to act as a voltage divider. As a result, operational amplifier 561 is configured as an inverting DC amplifier with a gain of approximately 5, as determined by the ratio of resistors 512 and 515. The values of resistors 512 and 515 are selected to produce a voltage change of 2 volts at the output terminal of amplifier circuit 554 when oscillator coil 220 is moved through the full range of motion along left-right axis 121 and up-down axis 122. A similar resistor selection process is carried out with the amplifier circuit (not shown) coupled to up-down receiver coil 103, with the resistance selected to produce a voltage change of 2 volts when oscillator coil 220 is moved through the full range of motion along up-down axis 122. Capacitor 529 limits the bandwidth of amplifier circuit 554 so that the DC output signal is stable during the conversion cycle of the attached analog-to-digital converter (ADC) (See, FIG. 6). The response time of amplifier circuit 554 is approximately 500 micro-seconds, ten times the conversion time of the ADC.

Resistors 513 and 514 bias operational amplifier 561 and control the nominal DC output voltage of operational amplifier 561. Variable resistor 514 is configured as a voltage divider so that as resistor 514 is adjusted, a continuous voltage between 0 and 5 volts is provided through resistor 513 such that the DC output voltages provided by operational amplifier 561 span the entire operating range of the ADC (e.g., 1–3 volts). To do this, resistor 514 is adjusted so that the signal provided at the output terminal of operational amplifier 561 has a voltage equal to the upper limit of the operating range of the ADC (e.g., 3 volts) when the transmitter circuit 204 of ring 101 is disabled. The overall gain of amplifier circuit 500 is selected such that the signal provided at the output terminal of operational amplifier 561 has a voltage approximately equal to 1 volt when the transmitter circuit 204 of ring 101 is enabled and ring 101 is positioned at the operating position closest to receiver coils 102 and 103.

Analog-to-Digital Converter

Figure 6:
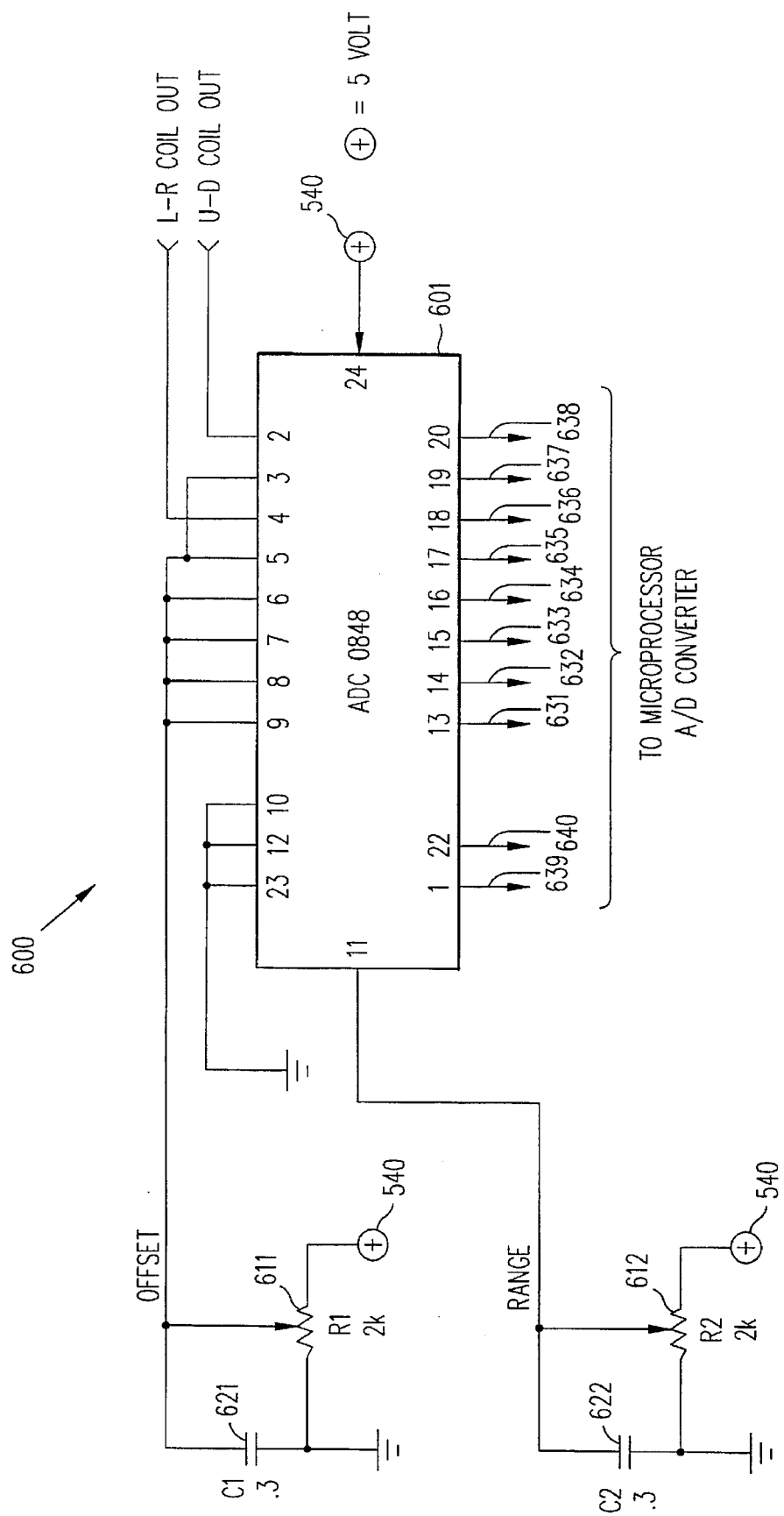
FIG. 6 is a schematic of an analog-to-digital converter circuit of the cursor control system of FIG. 1.

FIG. 6 is a schematic of analog-to-digital converter (ADC) circuit 600, which includes ADC 601. Although the embodiment illustrated uses an 8 bit ADC, other numbers of bits can be used. For example, an ADC having 10 bit resolution would provide the benefits of higher resolution and smoother cursor movement.

ADC 601 is a conventional four channel ADC available from National Semiconductor as part number ADC 0848. Only two of the four channels are used in ADC circuit 600. Left-right receiver coil 102 is coupled to a first channel (through its associated amplifier circuit 500) and up-down receiver coil 103 is coupled to a second channel (through its associated amplifier circuit). Resistor 611 and capacitor 621 are coupled to voltage supply rails 540 and 541 as illustrated to form a voltage divider circuit to adjust the offset of ADC 601. The offset is adjusted such that ADC 601 provides a maximum output value (i.e., FF in hexadecimal notation) on leads 631–638 when ring 101 is disabled or located at the far limit of reception (i.e., when the voltage provided by amplifier circuit 500 is 3 volts).

Resistor 612 and capacitor 622 are coupled to voltage supply rails 540 and 541 as illustrated to form a voltage divider circuit to control the full scale operating range of ADC 601. Because the voltage provided by amplifying circuit 500 varies from 1 to 3 volts, the operating range is nominally set to 2 volts. As a result, ADC circuit 600 produces a minimum output signal (00 hex) when transmitter circuit 204 is enabled and ring 101 is positioned close to receiving coils 102 and 103 (i.e., when the voltage provided by amplifier circuit 500 is 1 volt). Digital values are transmitted from ADC 601 to microprocessor circuit 105 on leads 631–638 in response to control signals received from microprocessor circuit 105 on leads 639–640. The control signals provided on leads 639–640 select the channel of ADC 601 (i.e., determine whether the digital values transmitted to output leads 631–638 were derived from left-right receiver coil 102 or up-down receiver coil 103).

To reduce production costs, ADC circuit 600 can be integrated with the processing integrated circuit (not shown) which is conventionally used to scan the keys of keyboard 106. In alternate embodiments, the amplifier circuits (e.g., amplifier circuit 500 and the corresponding amplifier circuit connected to up-down receiver coil 103), ADC circuit 600 and microprocessor circuit 105 can be fabricated on the same chip, different chips or various combinations of chips.

Microprocessor Circuit

Figure 7:
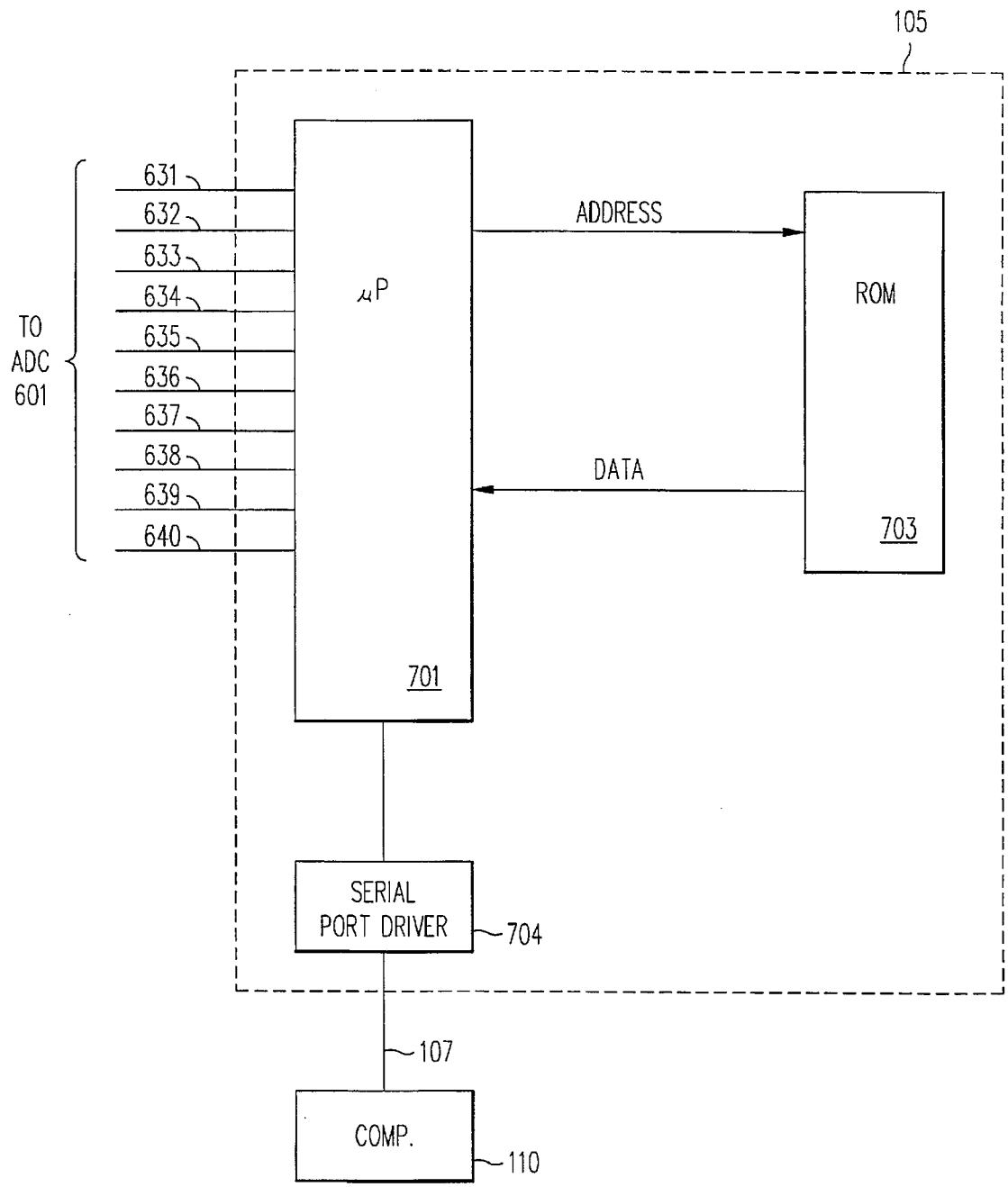
FIG. 7 is a schematic diagram of a microprocessor circuit of the cursor control system of FIG. 1.

FIG. 7 is a schematic diagram of microprocessor circuit 105. Microprocessor circuit 105 includes microprocessor 701, read only memory 703 and serial port driver 704. In one embodiment, microprocessor 701 is a conventional microprocessor available from Intel as part number 8051. Microprocessor 701 is connected to ADC 601 and controls the conversion cycle of ADC 601. Serial port driver 704 is connected to computer 110 through serial cable 107. Microprocessor circuit 105 is programmed to operate as described below.

Software

Figure 8B:
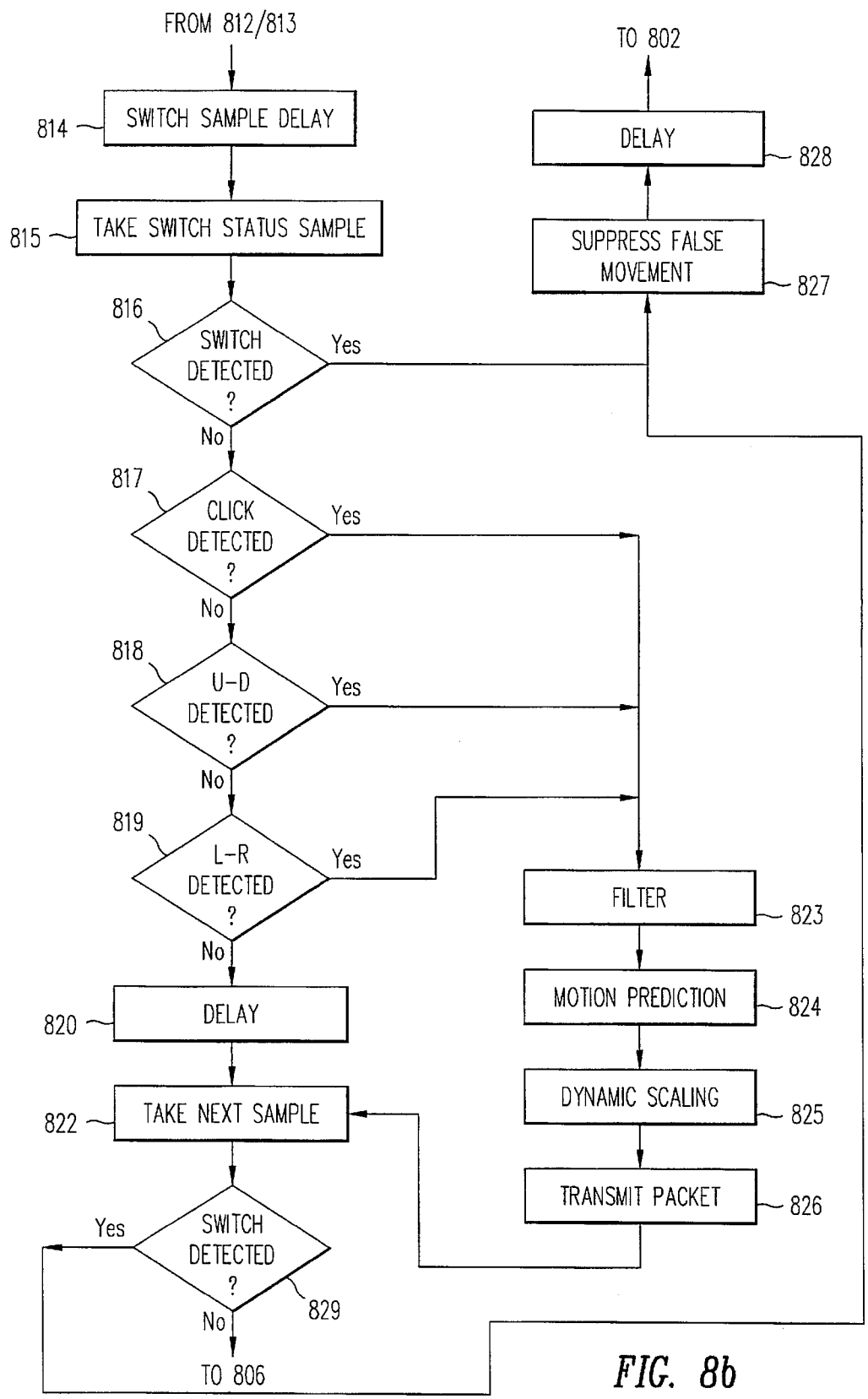
FIG. 8 is a flow diagram of software instructions used by the microprocessor circuit of FIG. 7.

FIG. 8, which includes FIGS. 8a and 8b as illustrated, is a flow diagram of the software instructions used by microprocessor circuit 105 in one embodiment of the present invention. In this embodiment, a mouse "click" button 131 is mounted at the bottom of keyboard 106 as illustrated in FIG. 1. The present example also assumes that the communication protocol between cursor control system 100 and computer 110 is the industry standard Microsoft serial mouse protocol. This feature set is chosen because it is a popular setup for a typical portable computer. The flow diagram will be slightly different if other features are implemented. For example, different flow diagrams will result if a ring mounted click button is implemented or if other mouse protocol (e.g., bus mouse, PS/2 mouse, Apple mouse, etc.) are used.

Software within microprocessor circuit 105 controls the operation of ADC 601 (FIG. 6), computes movement of ring 101 along up-down axis 122 and left-right axis 121 based on the digital values obtained from ADC 601, performs digital signal processing to create smooth movement of cursor 111, detects the activation of transmitter circuit 204 of ring 101, and transmits movement data to computer 110 to control the operation of cursor 111 (FIG. 1). Because a primary application of cursor control system 100 is in battery powered portable computers, the control software is optimized for execution by low cost 8-bit microcomputers running at low speed, thereby keeping cost and power consumption at a minimum. To further reduce hardware requirements, movement computation and digital signal processing functions of the embedded firmware can be relegated to the mouse driver software executed by host computer 110. The additional computational load presented to host computer 110 is generally negligible, and greater flexibility can be provided for users to customize the behavior of cursor control system 100.

After computer 110 has been powered up (step 801) and initialized (step 802), microprocessor begins sampling the digital values provided by ADC 601 (step 803). Acceptable cursor response time can be achieved by sampling ADC 601 at a frequency of 20–50 Hz. In one embodiment, a sampling rate of about 33 Hz is chosen as a result of tradeoffs between response time, power consumption, and code efficiency.

A delay of one position sampling period, approximately 30 msec, is inserted (Step 804) between the first sample (Step 803) and the second sample (Step 805). Both left-right receiver coil 102 and up-down receiver coil 103 are sampled in Steps 805 and 803. The difference between the two samples taken from left-right receiver coil 102 is representative of the number units traveled by ring 101 along left-right axis 121. Similarly, the difference between the two samples taken from up-down receiver coil 103 is representative of the number of units traveled by ring 101 along up-down axis 122. The signs of these differences indicate the directions of movement along these axes.

The software computes the movement of ring 101 along the left-right axis 121 and the up-down axis 122 from the samples received from left-right receiver coil 102 and up-down receiver coil 103 (Steps 806 and 807).

Figure 9:
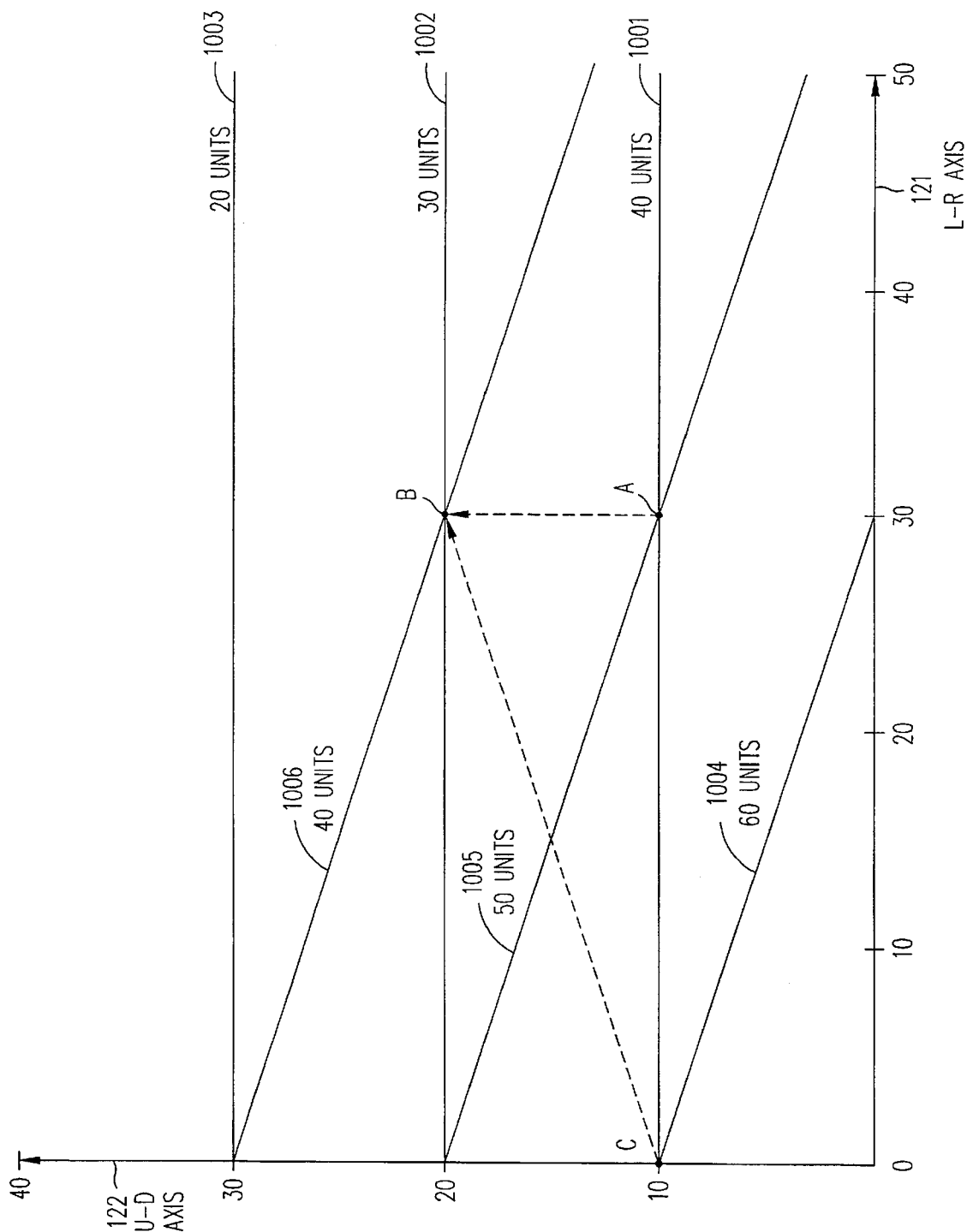
FIG. 9 is a schematic diagram illustrating the strength of the signals induced in the receiver coils for different ring positions.

The signal received by up-down receiver coil 102 varies almost exclusively with the position of oscillator coil 220 along up-down axis 122, while the signal received by left-right receiver coil 102 varies with the position of oscillator coil 220 along both left-right axis 121 and up-down axis 122. The left-right receiver coil 102 is almost three times more responsive to the motion of oscillator coil 220 along up-down axis 122 than it is to the motion of oscillator coil 220 along left-right axis 121. The signal induced in up/down receiver coil 103 is therefore used to isolate the portion of the signal induced in the left-right receiver coil 102 which is representative of the position of the oscillator coil 220 along left-right axis 121. FIG. 9 further illustrates this point.

FIG. 9 is a schematic diagram illustrating the strength of the signals induced in receiver coils 102 and 103 for different positions of oscillator coil 220. Isobars 1001, 1002 and 1003 represent the strength of signals induced in up-down receiver coil 103, and isobars 1004, 1005 and 1006 represent the signal strength induced in left-right receiver coil 102 for various positions along up-down axis 122 and left-right axis 121. Thus, when oscillator coil 220 is positioned along isobars 1001, 1002 and 1003, up-down coil 103 will receive signals having strengths of 40, 30 and 20 units, respectively. When oscillator coil 220 is positioned along isobars 1004, 1005 and 1006, left-right coil 102 will receive signals having strengths of 60, 50 and 40 units, respectively. The tilted nature of isobars 1004–1006 is due to the fact that left-right receiver coil 103 detects movement along both left-right axis 121 and up-down axis 122.

If the user moves oscillator coil 220 from point A to point B along the up-down axis 122, the strength of the signal detected by up-down coil 103 changes by ten units (i.e., from 40 units to 30 units). However, the strength of the signal detected by left-right coil 102 undesirably changes by ten units (i.e., from 50 units to 40 units), even though no motion is made along left-right axis 121.

Similarly, if the user moves oscillator coil 220 from point C to point B along up-down axis 122 and along left-right axis 121, the strength of the signal detected by up-down coil 103 changes by ten units (i.e., from 40 units to 30 units). However, the strength of the signal detected by left-right coil 102 changes by 20 units (i.e., from 60 units to 40 units), even though the true movement along left-right axis 121 would properly be represented by a change of 10 units (i.e., from 60 units to 50 units).

To remedy this problem, the up-down component of the signal detected by left-right coil 102 is removed by the software. This process also minimizes the effects of mutual inductance between coils 102 and 103. The amount of up-down component to be removed is determined by the amount of actual up-down movement detected by the up-down receiver coil 103. The two coils 102 and 103 are matched so that the mapping between the up-down coil reading and the adjustment for the left-right coil is a deterministic function of the slope of the isobars of the left-right coil, the initial and final transmitter position along the up-down axis 122 and the distance travelled along the up-down axis 122. Mathematically, this presents a complex equation. However, due to the human ability to adapt eye-hand coordination and the incorporation of a motion smoothing signal processing algorithm, exact compensation is unnecessary. As a result, the compensation algorithm can be greatly simplified and implemented using a look-up technique.

The software also calculates the velocity of the user's finger along left-right axis 121 (Step 809) and along up-down axis 122 (Step 808) by determining the change in position of ring 101 during a known sampling period. The calculated velocity is then used to dynamically scale the relationship between distance travelled by the user's finger and the distance travelled by the cursor on the computer screen (Step 825). At high finger velocities, the software provides a large scaling factor, so that a rapid finger movement will move the cursor a large distance across the computer screen. Conversely, at low finger velocities, the software provides a small scaling factor, so that a slow finger movement will move the cursor small (but precisely controlled) distance across the computer screen. Dynamic scaling advantageously allows the user's finger to remain within a small area over the keyboard to perform all cursor movements.

Digital filtering for motion smoothing is performed using a modified moving average filter (See Steps 810–813 and 823). Like a conventional moving average filter, a low pass digital filtering effect is achieved by taking a moving average of 8 samples. Two filter buffers (not shown) of 8 entries each are used to implement the filters for up-down and left-right movement. Conventional moving average filters create a lag in the cursor response. While the cursor lag is negligible during normal continuous finger movement, this lag causes overshoots and eventually leads to oscillation during slow stop-and-go finger movement which involves rapid directional changes. For example, during the time that finger motion moves along left-right axis 121 and then comes to a stop, the eight values stored in a conventional left-right filter buffer might be 14, 12, 10, 8, 6, 4, 2, and 0. At the time that the "0" value is received, the conventional filter will average the previous eight samples to produce a value of 7 (56/8). This "7" value will cause undesired motion at the time that the "0" value is received. As a result, the user will have to attempt to reposition the cursor.

Accordingly, the present invention provides a modified moving average filter which improves the cursor responsiveness during slow speed precision pointing operations by suppressing the lag-induced oscillation. The rapid damping action is implemented by resetting all entries in a left-right or up-down filter buffer to zero whenever a zero movement along the left-right or up-down axes, respectively, is detected. Movement samples are provided to the filter buffers at a frequency (e.g., 33 Hz) that is relatively high with respect to human finger movement. As a result, the filter buffers are assured of detecting when a zero movement condition exists. The modified moving average filter effectively eliminates unwanted movement due to unsteady fingers without reducing responsiveness. Steps 810–813 (FIG. 8a) provide for clearing the left-right and up-down filter buffers upon detecting zero movement conditions. Step 823 (FIG. 8b) provides moving average filtering.

After Steps 810–813 are performed, a switch detection delay is introduced (Step 814) and a switch status sample is taken from ADC 601 for each of receiver coils 102 and 103 (Step 815). In one embodiment, the delay introduced by step 814 is selected such that approximately 15 msec elapses between sampling step 805 and sampling step 815. Sampling step 805 is only performed during the initial pass through the flow diagram of FIG. 8. During subsequent passes, sampling step 805 is replaced with sampling step 822. Consequently, the delay introduced by step 814 is selected such that approximately 15 msec elapses between sampling step 815 and sampling step 822 during subsequent passes.

The samples taken during sampling step 815 are compared with the samples taken during sampling step 805 (or sampling step 822) to determine whether transmitter circuit 204 was switched (on or off) (Step 816) in the time between the times that these samples were taken. When transmitter circuit 204 is switched (i.e., when the user places a thumb across switch 203 or removes a thumb from switch 203), the signals induced in receiver coils 102 and 103 increase (or decrease) rapidly as a function of the on/off switching rise/fall transition time of transmitter circuit 204, thereby creating a fast-changing signal. Because this switching transition time is relatively fast, the switching of transmitter circuit 204 results in a large difference between successive samples taken from coils 102 and 103. The large difference in these samples, if transmitted to computer 110, will be interpreted as a large movement of ring 101, thereby causing cursor 111 to jump unpredictably. To prevent this undesirable jumping movement, the samples which would cause the undesirable jumping movement are suppressed (Step 827) (i.e., not transmitted to computer 110).

The switching of transmitter circuit 204 is assumed to occur when the difference between successive samples exceeds a predetermined threshold value (which is selected based on the known switching characteristics of transmitter circuit 204). The predetermined threshold value is selected such that the normal movement of a human finger can not move fast enough to exceed the predetermined threshold value. The switch sampling period (15 msec) is selected to guarantee the positive identification of a switching operation. The signal change created by switching transmitter circuit 204 is typically 10 times faster than signal changes generated by human finger movement.

The samples taken during step 815 are referred to as switch status samples because these samples are used exclusively to determine whether transmitter circuit 204 has been switched. The switch status samples taken during step 814 are not used to provide cursor positioning information. The samples taken during steps 805 and 822 provide the positioning information for cursor control system 100.

After the sample is suppressed (Step 827), a delay is introduced (step 828) to allow cursor control system 100 to settle. Cursor control system 100 is then re-initialized (step 802) and the process continues at sampling step (step 803).

If switching of transmitter circuit 204 is not detected at step 816, processing continues with steps 817–819. If click button 131 (FIG. 1) is pressed (Step 817), movement along up-down axis 122 is detected (Step 818) or movement along left-right axis 121 is detected (Step 819), processing proceeds to a motion smoothing process which includes filtering step 823, motion prediction step 824 and dynamic scaling step 825. The motion smoothing process is used because the movement of ring 101 is unsupported and unrestricted in three dimensional space. (unlike a conventional mouse which is usually supported by a rigid surface and confined to two dimensional movement). The motion smoothing process is designed to produce reasonably smooth cursor motion with only 8-bit analog to digital resolution.

Filtering step 823 is performed in accordance with the modified moving average filter as previously described in connection with steps 810–813.

Dynamic scaling step 825 is performed as previously described in connection with velocity sensing steps 808 and 809. In an alternate embodiment of the invention, dynamic scaling step 825 is performed immediately after the up-down and left-right velocities are calculated in Steps 808 and 809, respectively.

To perform motion prediction step 824, the software saves a motion history which includes the positions of previous position samples. In one embodiment, the motion history includes eight movement samples, each taken 0.15 seconds apart. In other embodiments, these movement samples can be taken at other intervals. The software analyzes these samples to predict the likelihood that the user's finger is attempting to move along left-right axis 121 or up-down axis 122.

In one embodiment, the samples are used to calculate the trajectory of the movement. If the slope of the trajectory falls within a pre-defined threshold, an attempted straight line movement along left-right axis 121 or up-down axis 122 is assumed. Once a left-right or an up-down movement trend is detected, the current samples which represent movement in the predicted direction are relied on more heavily to determine the movement of the cursor. This can be done in different ways. For example, the gain of samples representing movement in the predicted direction can be increased while the gain of samples representing movement in the non-predicted directions can remain the same or be reduced. Alternatively, the gain of samples representing movement in the predicted direction can remain the same while the gain of samples representing movement in the non-predicted directions can be reduced. The net effect is a detectable smoothing bias towards either left-right or up-down movement. This smoothing bias enables the user to easily move cursor 111 in straight lines along either left-right axis 121 or up-down axis 122 on screen 112.

Once movement along left-right axis 121 or up-down axis 122 is detected, motion in directions other than along the predicted direction is penalized. As a result, slightly larger finger movement along a non-predicted direction is required to change the direction of cursor movement from the predicted direction. However, the amount of gain adjustment introduced during the motion prediction step 824 can be selected such that this penalty is undetectable by the human user.

The desirable amount of motion prediction is highly dependent on user preference, training level, and application profile. The motion prediction step 824 can be adjusted for the particular abilities of the user. For example, a person adept at moving a finger along left-right axis 121 could program motion prediction step 824 such that finger movement occurring within plus or minus five degrees of the left-right axis 121 is interpreted as an attempt to trace a straight line along left-right axis 121. A person not so adept at tracing straight lines might program motion prediction step 824 to interpret movement within plus or minus 15 degrees as an attempt to trace a straight line. In one embodiment, the motion prediction step 824 is implemented in mouse driver software executed by the host computer 110. In such an embodiment, all performance parameters of motion prediction step 824 can be customized through host computer 110. In a particular embodiment, the mouse driver software of computer 110 implements a learning mode in which users are asked to trace figures on the screen. This exercise can consist of straight line movement, curved line movement, low/high speed movement, and various point and select exercises. Cursor control system 100 measures the skill level and preference suggested by the user's movements and adjusts the performance parameters of motion prediction step 824 automatically to achieve the best parameters for the particular user. In this manner, cursor control system 100 provides automatic performance customization.

In another variation, motion prediction step 824 is used to predict straight line movement in all directions. In such an embodiment, it is assumed that the user always intends to move the cursor along a straight line in some direction. The slope of the calculated straight line is used to ratio the gain adjustment.

After the motion smoothing process (Steps 823–825) is complete, the software assembles a packet containing the processed movement data in a conventional format and transmits this data packet to computer 110 (Step 826). The transmission of the data packet is performed serially. The format of the data packet is the same as the format of data packets sent from a conventional peripheral computer input device (e.g., a mouse) to the computer.

After the last byte of the data packet is transmitted to computer 110, processing proceeds to step 822, where the next samples from receiver coils 102 and 103 are taken. The timing of steps 823–825 are selected such that the processing time for these steps produces a natural delay of approximately 15 msec. As a result, the samples taken at step 822 are taken 15 msec after the samples previously taken at step 815.

Returning now to the alternate path of the flow diagram, if click button 131 is not pressed (Step 817), movement along up-down axis 122 is not detected (Step 818) and movement along left-right axis 121 is not detected (Step 819), processing proceeds to delay step 820 and sampling step 822. Delay step 820 causes a delay which is selected to provide approximately 15 msec between sampling steps 815 and 822.

The samples taken at steps 815 and 822 are then compared to determine if transmitter circuit 204 was switched during the time which elapsed between these samples (Step 829). Switching detection step 827 proceeds in the same manner as switching detection step 816. If switching is detected at step 829, processing proceeds to false movement suppression step 827. If switching is not detected at step 829, processing returns to step 806. At this point, processing continues as previously described.

Figure 10:
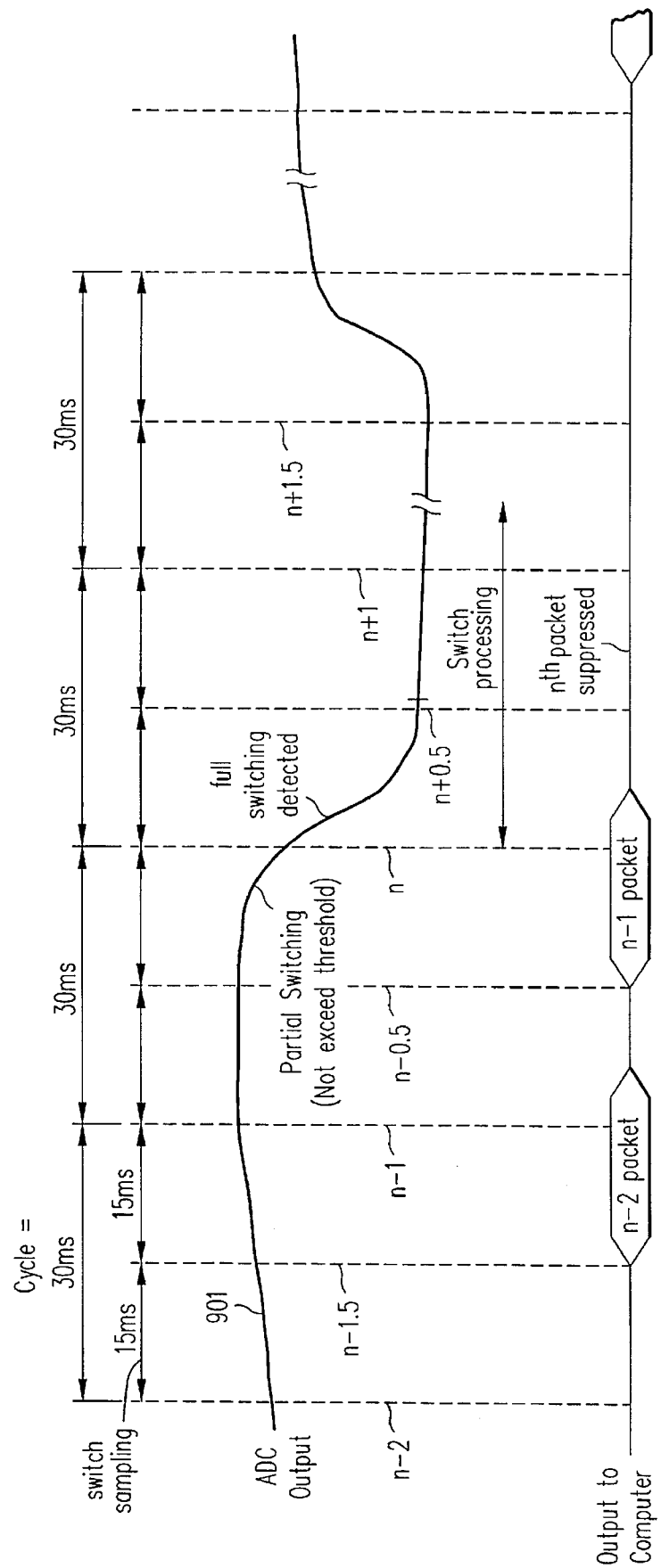
FIG. 10 is a timing diagram illustrating software suppression of samples which occur during switching of the transmitter circuit of FIG. 2.

FIG. 10 is a timing diagram which helps to illustrate operation of cursor control system 100 as previously described in connection with FIG. 8. Line 901 represents the ADC output signal corresponding to one of receiver coils 102 or 103. Line 901 is sampled at times (n–2), (n–1.5), (n–1), (n–0.5), (n), (n+0.5), (n+1), (n+1.5), etc. In the embodiment previously described, there is a 15 msec delay between each of these samples. The samples taken at times (n–1.5), (n–0.5), (n+0.5), (n+1.5), etc., are switch status samples taken during Step 815 of FIG. 8. The samples taken at times (n–2), (n–1), (n), (n+1), etc., are samples taken during Step 822 of FIG. 8. As previously described, only the samples taken during Step 822 (e.g., the samples taken at times (n–2),(n–1), (n) etc.) are used (if they are not suppressed) to control the position of the cursor on the computer screen. The samples taken during Step 815 are used to detect whether switching of transmitter circuit 204 (FIG. 3) has occurred.

A 15 msec delay (Step 814) is introduced between the time that the samples are taken during Step 822 and the time these samples are transmitted to computer 110 (Step 826). For example, the sample taken at time (n–2) is not transmitted to computer 110 until time (n–1.5). As described below, this 15 msec delay facilitates the suppression of erroneous data introduced by the switching of transmitter circuit 204.

On/off switch 203 of transmitter circuit 204 is switched at times which are asynchronous with respect to the sampling performed during Steps 815 and 822. Switch 203 can be switched entirely within a position sampling period (30 msec) (i.e., complete switching) or may occur over two position sampling periods. A special case known as partial switching arises when (1) the switching occurs too late in a sampling period for the signal change to exceed the threshold which indicates that switch 203 has been switched, and (2) the switching occurs in time to create a difference between successive position samples which is large enough to cause unwanted cursor movement if not suppressed. Cursor control system 100 is designed to reliably detect partial and complete switchings.

In the example illustrated in FIG. 10, transmitter circuit 204 is partially switched between times (n–0.5) and (n). The difference between the sample at time (n–0.5) and the sample at time (n) is less than the predetermined threshold value which indicates that transmitter circuit 204 has been switched. However, the difference between the sample at time (n) and the sample at time (n+0.5) is greater than this predetermined threshold value. As a result, the software detects that transmitter circuit 204 is being switched at time (n+0.5).

Because the sample taken at time (n) was actually part of the switching of transmitter circuit 204, it is desirable to suppress this sample, thereby eliminating the erroneous cursor movement that this sample will cause. Because the transmission of the sample taken at time (n) is delayed by 15 msec, this sample has not been transmitted to computer 110 at the time that the software detects that transmitter circuit 204 is being switched. As a result, the software is able to suppress the sample taken at time (n) before this sample causes erroneous cursor movement.

In the embodiment previously described, the fast-changing signal generated when switch 203 of transmitter circuit 204 is switched is used to communicate the status of on/off switch 203 to microcomputer circuit 105. Thus, when a fast-changing signal is detected, the samples associated with this signal are suppressed and microcomputer circuit 105 is informed that transmitter circuit 204 is turned on or off (depending on the polarity of signal change).

Figure 11:
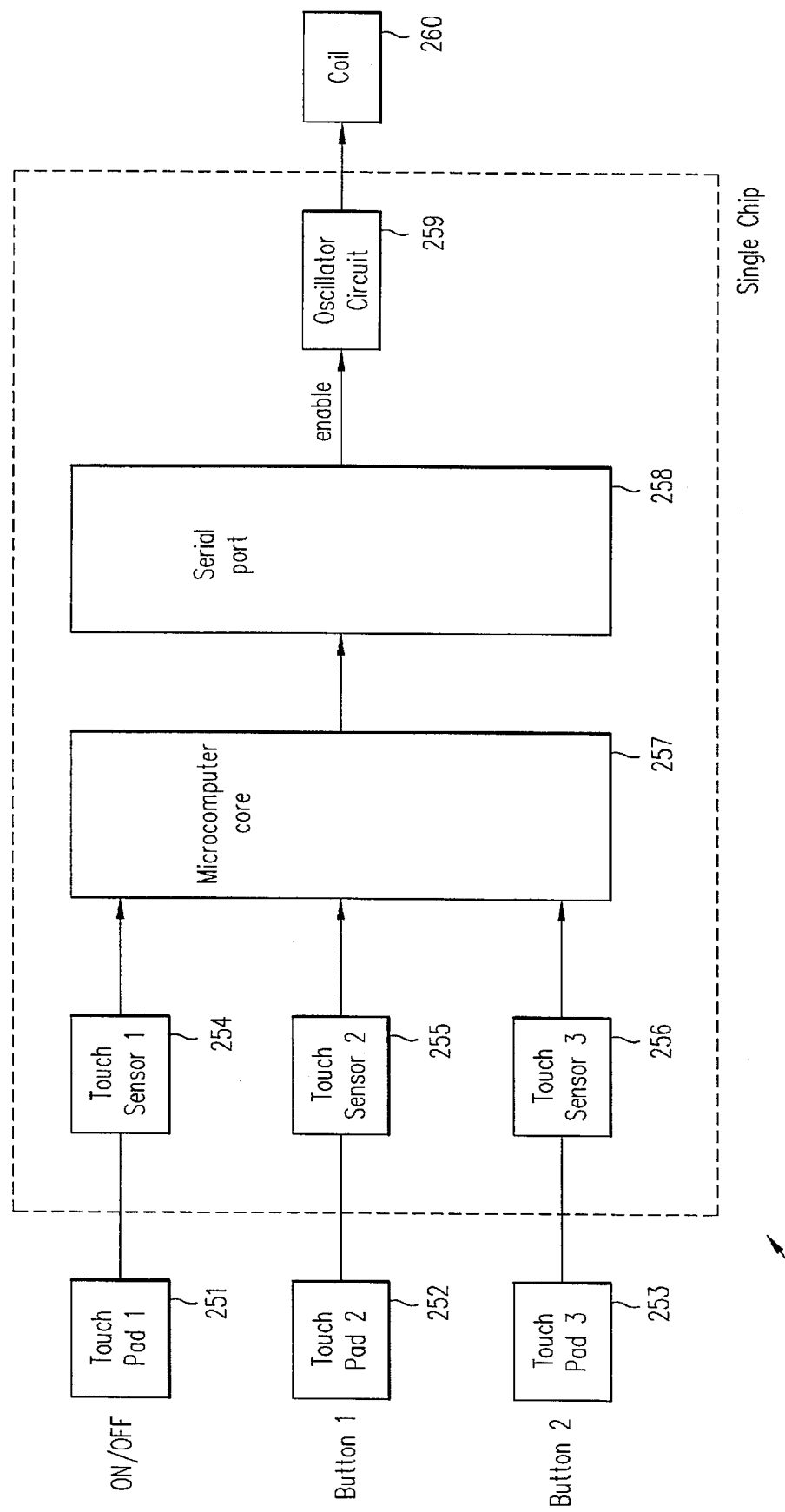
FIG. 11 is a block diagram illustrating a transmitter circuit for a ring having an on/off switch and two click switches.

In another embodiment, fast-changing signals are used to send encoded information. Thus, transmitter circuit 204 can be used to send information, even when transmitter circuit 204 is not enabled by closing on/off switch 203. For example, the fast changing signals associated with switching transmitter circuit 204 can be used to implement one or more "click" switches on ring 101. FIG. 11 is a block diagram illustrating a transmitter circuit 250 for a ring having an on/off switch 251 and two click switches 252 and 253. Sensors 254, 255 and 256 detect when a user touches switches 251, 252 and 253, respectively. When sensors 254–256 detect an activated switch, these sensors transmit a signal to microcomputer 257. In response, microcomputer 257 transmits an oscillator enable signal through serial port 258 to oscillator circuit 259. When the oscillator enable signal is at a high state, oscillator circuit 259 is turned on, thereby causing transmitter circuit 250 to generate the desired signal. This signal is transmitted from oscillator coil 260. In one embodiment, sensors 254–256, microcomputer 257, serial port 258 and oscillator circuit 259 are fabricated on the same chip.

Figure 12:
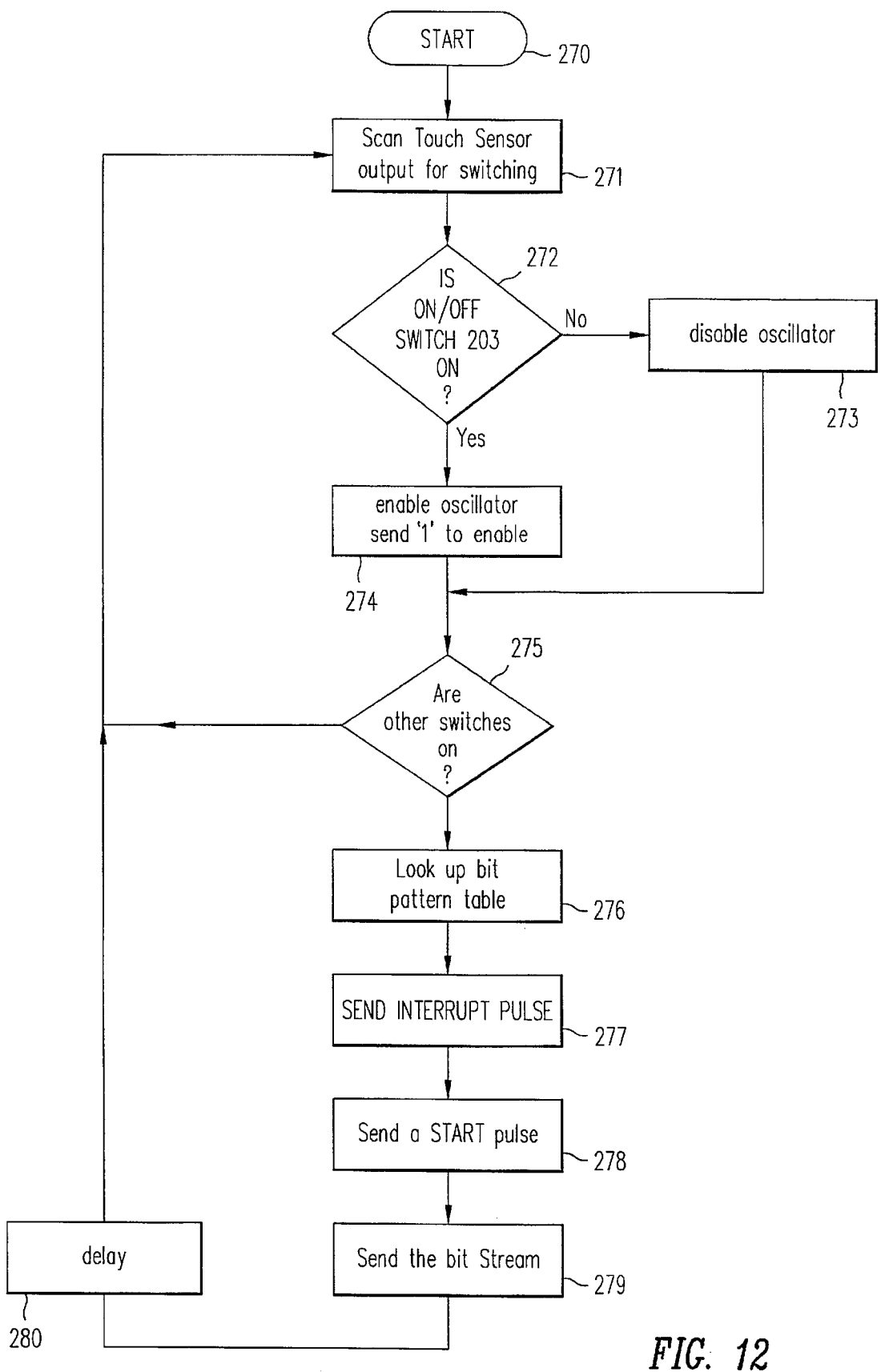
FIG. 12 is a flow diagram illustrating operation of the transmitter circuit of FIG. 11.

FIG. 12 is a flow diagram which illustrates how microcomputer 257 generates oscillator enable signals in response to the status of switches 251–253. After computer 110 is started (Step 270), microcomputer 257 scans touch sensors 254–256 to detect when switches 251–253 are switched (Step 271). If on/off switch 251 is closed, microcomputer 257 generates a high oscillator enable signal (Steps 272, 274). If on/off switch 251 is open, microcomputer core 257 does not generate an oscillator enable signal, thereby disabling oscillator circuit 259 (Steps 272, 273).

If switches 252 and 253 are both open, the oscillator enable signal remains in the previously determined state and processing loops back to the sensor scanning step 271.

If one or both of switches 252 and 253 are closed, processing proceeds to Step 276. In Step 276, a look up table is accessed within microcomputer 257. The look up table will cause the generation of different bit patterns depending on the status of switches 251–253. Table 1 is an example of a possible look up table, where a "0" value in the first three columns indicates an open switch and a "1" value in the first three columns indicates a closed switch.

TABLE 1

| Switch 251 | Switch 252 | Switch 253 | Corresponding Bit Steam |
|---|---|---|---|
| 0 | 0 | 0 | None (See Steps 271–275) |
| 0 | 0 | 1 | 0 0 1 |
| 0 | 1 | 0 | 0 1 0 |
| 0 | 1 | 1 | 0 1 1 |
| 1 | 0 | 0 | None (See Steps 271–275) |
| 1 | 0 | 1 | 1 0 1 |
| 1 | 1 | 0 | 1 1 0 |
| 1 | 1 | 1 | 1 1 1 |

Microcomputer 257 then generates an interrupt pulse (Step 277) by switching the current state of the oscillator enable signal. Thus, if the oscillator enable signal is in a high state, the interrupt pulse consists of switching the oscillator enable signal to low state. Because the interrupt pulse is a fast-changing signal, the interrupt pulse is suppressed as previously discussed in connection with FIG. 8.

Microcomputer 257 then generates a start pulse after a predetermined delay after the interrupt pulse (Step 278). The start pulse is generated by switching the current state of the oscillator enable signal. The predetermined delay provides a synchronization point for the software to distinguish fast-changing signals generated during Steps 273–274 from the fast-changing signals generated during Step 277. If no start pulse is received at the end of the predetermined delay period, then the fast-changing signal is generated during Steps 273–274 (i.e., during switching of on/off switch 203). If a start pulse is received at the end of the predetermined delay, then the software prepares to receive a bit stream which indicates the status of switches 251–253. The successive generation of an interrupt pulse and a start pulse only occurs when one of the click buttons 252 and 253 is activated.

After the start pulse is generated, microcomputer 257 transmits the bit stream corresponding to the detected status of switches 251–253 by controlling the state of the oscillator enable signal. Thus, when switch 251 is on, switch 252 is off and switch 252 is on, microcomputer 257 sequentially transmits high, low and high oscillator enable signals. These oscillator enable signals are generated at predetermined times after the start pulse is generated. These oscillator enable signals are held at the previously described levels for periods of time which assure detection during the sampling period cursor control system 100. A delay is then introduced (Step 280) to suppress multiple transmissions due to the relatively slow human reaction time to remove fingers from switches 252–253. By suppressing multiple transmissions, power is saved within transmitter circuit 250. The relatively slow human reaction time can also be compensated for by changing the delay in Step 828 (FIG. 8b).

In an alternate embodiment, instead of transmitting bit streams, the status of switches 251–251 are communicated by pulse width modulation. That is, the status of switches 251–253 are communicated by generating oscillator enable signals having different durations.

The software previously described in connection with FIG. 8 must be modified to properly process the information provided by transmitter circuit 250. Specifically, this software must detect (and suppress) two successive fast changing signals (i.e., the interrupt pulse followed by the start pulse) and then suppress the bit stream which follows the start pulse. The bit stream which follows the start pulse can be suppressed by automatically suppressing samples received for a predetermined time period (e.g., 100 msec) after the start pulse is detected. This predetermined time period should be short enough that the user does not detect any noticeable delay due the processing of the bit stream. The software also decodes the bit stream and generates signals which correspond to the actions requested by the bit stream (e.g., a "click" operation).

Although transmitter circuit 250 has been described in connection with click buttons 252 and 253, it is understood that these switches can be used to provide any type of information from ring 101 to computer 110. For example, one of these switches can be used as a "gesture recognition" switch. The receiver software (or the mouse driver software) is programmed to detect a preselected movement pattern when the "gesture recognition" switch is closed. For example, after closing the gesture recognition switch, a "Z" shaped pattern traced by the user's finger can cause the software to initiate a zoom function. Another pattern traced by the user's finger can cause the software to initiate a "proximity click" operation. A proximity click operation allows the user to click on a small target on the computer screen by closing the gesture recognition switch and then moving the cursor in a circle around the target to be clicked on. Upon detecting this gesture, the mouse driver software will automatically move the cursor over the small target and perform a click operation. In another example, a switch can be used to transmit a low battery warning signal to the receiver software. In yet another example, a switch can be used to emulate multiple click buttons.

In an alternate embodiment of the present invention, cursor control system 100 can be used in conjunction with a conventional peripheral computer input device to control a single cursor or to independently control two cursors. In the case where one cursor is being controlled, the user can specify whether cursor control system 100 or the peripheral computer input device gets higher priority when both devices are activated at the same time.

In yet another embodiment of the invention, cursor control system 100 can be modified to operate in response to three-dimensional movement of ring 101 by adding a third receiver coil. This third receiver coil would be similar to left-right receiver coil 102, but would be rotated 90 degrees on keyboard 106. The third receiving coil would be used to detect in-out movement of ring 101 along an in-out axis which runs in toward and out from screen 112.

Although the invention has been described in connection with several embodiments, it is understood that this invention is not limited to the embodiments disclosed, but is capable of various modifications which would be apparent to one of ordinary skill in the art. For example, receiving means other than the described receiver coils can be used to detect the signal transmitted by the ring. Thus, the invention is limited only by the following claims.

We claim:

1. A cursor control system comprising:
   a ring;
   a transmitter circuit attached to the ring;
   a switch attached to the ring, wherein the switch is formed for enabling the transmitter circuit; and
   a receiver mounted on a keyboard, wherein the receiver detects motion of the transmitter circuit over the keyboard.

2. The cursor control system of claim 1, wherein the receiver comprises:
   first receiver means positioned such that a signal transmitted by the transmitter circuit induces a first signal in the first receiver means, wherein the first signal varies as the ring is moved along an up-down axis over the keyboard;
   second receiver means mounted on the keyboard, wherein the second receiver means is positioned such that the signal transmitted by the transmitter circuit induces a second signal in the second receiver means, wherein the second signal varies as the ring is moved along a left-right axis over the keyboard; and
   means for moving a cursor on a screen in response to the first and second signals.

3. The system of claim 2, further comprising:
   a first amplifier circuit coupled to the first receiver means;
   a second amplifier circuit coupled to the second receiver means;
   an analog-to-digital converter (ADC) circuit coupled to the first and second amplifier circuits; and
   a microprocessor circuit coupled to the ADC circuit and to a port of a computer which receives signals used to control the movement of the cursor on the computer screen.

4. The system of claim 2, further comprising:
   control means coupled to the first and second receiver means, wherein the control means process the first and second signals to create signals which control the movement of a cursor on a computer screen.

5. The system of claim 1, further comprising a click button attached to the ring.

6. The system of claim 1, further comprising:
   means for recognizing when movement of the ring matches a predetermined pattern of ring movement; and
   means for generating a control signal when said means for recognizing determines that the movement of the ring matches the predetermined pattern of ring movement.

7. The system of claim 6, further comprising a gesture recognition switch attached to the ring, wherein the means for recognizing are enabled when the gesture recognition switch is closed.

8. The system of claim 1, wherein the transmitter circuit comprises an inductive coil attached to the ring, wherein the inductive coil is driven to transmit a signal a first frequency.

9. The system of claim 8, wherein the first frequency is a radio frequency.

10. The system of claim 8, wherein the first frequency is less than 600 kHz.

11. The system of claim 8, wherein the first frequency provides magnetic coupling between the inductive coil and the receiver.

12. The system of claim 8, wherein the receiver comprises a first coil and a second coil, and the inductive coil is formed at an angle within the ring, wherein the angle is selected to position the inductive coil substantially parallel with the first and second coils when the ring is worn on a finger positioned over the keyboard.

13. The system of claim 2, wherein the first receiver means comprises a coil having one or more substantially equal sized loops which traverse an outer perimeter of the keyboard.

14. The system of claim 2, wherein the second receiver means comprises a coil having a plurality of loops, wherein sizes of the loops progressively increase along a left-right axis of the keyboard.

15. The system of claim 2, further comprising:
   means for suppressing the first and second signals when the switch of the transmitter circuit is opened or closed.

16. The system of claim 2, further comprising:

means for calculating the velocity of the ring and scaling the cursor movement in response to the velocity of the ring.

17. The system of claim 2, further comprising:

motion prediction means for detecting when the ring is moving substantially along a predefined axis;

means for emphasizing signals representative of movement along the predefined axis relative to signals representative of movement in directions other than along the predefined axis when motion along the predefined axis is detected.

18. The system of claim 17, wherein the motion prediction means are programmable.

19. The system of claim 18, further comprising:

means for testing the ability of a user to operate the cursor control system;

means for programming the motion prediction means in response to the means for testing.

20. The system of claim 1, wherein the receiver further comprises:

means for generating a plurality of samples representative of the movement of the transmitter circuit over the keyboard;

a moving average filter coupled to the means for generating a plurality of samples, wherein the moving average filter stores a fixed number of samples, wherein the moving average filter is configured such that the samples stored by the moving average filter are reset to zero when the samples indicate zero movement of the transmitter circuit.

21. The system of claim 1, further comprising:

a second switch attached to the ring;

a switching circuit connected between the second switch and the transmitter circuit, wherein the switching circuit transmits at least two pulses to the transmitter circuit when the second switch is activated; and detecting means coupled to the receiver, wherein the detecting means detect that the second switch is activated when the at least two pulses are generated.

22. A cursor control system comprising:

a computer input device which generates a plurality of samples representative of movement of the computer input device;

a filter coupled to the computer input device, wherein the filter receives a plurality of samples representative of the movement of a computer input device, wherein the filter stores a fixed number of samples, wherein the filter is configured such that the samples stored by the filter are reset when a sample indicates the computer input device is not moving.

23. A cursor control system comprising:

a computer input device which generates a signal representative of movement of the computer input device;

motion prediction means for receiving the signal and detecting when the signal represents cursor movement substantially along a predefined axis;

means for emphasizing portions of the signal representative of movement along the predefined axis relative to portions of the signal representative of movement in directions other than along the predefined axis when motion along the predefined axis is detected.

24. A cursor control system comprising:

a computer input device which generates a signal having a fast changing characteristic during switching of the computer input device and having a slow changing characteristic during movement of the computer input device, wherein the computer input device communicates a first type of information using the fast changing characteristic of the signal and wherein the computer input device communicates a second type of information using the slow changing characteristic of the signal.

25. A method of controlling cursor operations on a computer screen comprising the steps of:

positioning a transmitter circuit over a keyboard;

activating a switch to enable the transmitter circuit;

transmitting a signal from the transmitter circuit, through free space, to a receiver attached to the keyboard;

detecting the transmitted signal with the receiver; and controlling a cursor on the computer screen in response to the signal detected by the receiver.

26. The method of claim 25, wherein the steps of detecting and controlling further comprising the steps of:

generating a first signal in response to the transmitted signal, wherein the first signal varies as the transmitter circuit is moved along a first axis over the keyboard;

generating a second signal in response to the transmitted signal, wherein the second signal varies as the transmitter circuit is moved along a second axis over the keyboard; and controlling the cursor on the computer screen in response to the first and second signals.

27. The method of claim 26, further comprising the step of suppressing the first and second signals at times when the switch is turned on and off, thereby preventing the first and second signals from controlling the cursor at these times.

28. The method of claim 26, further comprising the steps of:

calculating movement of the transmitter circuit along the first axis from the first signal; and calculating movement of the transmitter circuit along the second axis from the first and second signals.

29. The method of claim 26, further comprising the steps of:

sampling the first signal to obtain a first set of data values;

sampling the second signal to obtain a second set of data values;

monitoring the first and second sets of data values;

determining when the first and second sets of data values correspond to movement of the transmitter circuit along the first axis;

emphasizing the data values of the first and second sets which are representative of movement along the first axis with respect to the data values of the first and second sets which are not representative of movement along the first axis if the first and second sets of data values correspond to movement of the ring along the first axis.

30. The method of claim 29, further comprising the steps of:

determining when the first and second sets of data values correspond to movement of the ring along the second axis;

emphasizing the data values in the first and second sets which are representative of movement along the second axis with respect to the data values in the first and second sets which are not representative of movement along the second axis if the first and second sets of data values correspond to movement of the ring along the second axis.

31. The method of claim 26, further comprising the steps of:

calculating the velocity of movement of the transmitter circuit from the first and second signals; and scaling the movement of the cursor on the computer screen in response to the calculated velocity.

32. The method of claim 31, wherein the scaling step further comprises the steps of:

moving the cursor a large distance across the computer screen in response to high calculated velocity; and moving the cursor a small distance across the computer screen in response to a low calculated velocity.

33. The method of claim 26, further comprising the steps of:

sampling the first signal to obtain a first set of data samples which are representative of movement of the transmitter circuit along the first axis;

averaging a fixed number of the first set of data samples to obtain an average movement value;

setting the average movement value equal to zero if one of the data samples is representative of no movement of the transmitter circuit along the first axis; and moving the cursor on the computer screen in response to the average movement value.

34. The method of claim 25, further comprising the steps of:

transmitting a fast changing signal from the transmitter circuit to the receiver to communicate a first type of information; and transmitting a slow changing signal from the transmitter circuit to the receiver to communicate a second type of information.

* * * * *